United States Patent [19]

Sundararajan et al.

[11] Patent Number: 5,371,696

[45] Date of Patent: Dec. 6, 1994

[54] COMPUTATIONAL STRUCTURES FOR THE FAST FOURIER TRANSFORM ANALYZERS

[76] Inventors: Duraisamy Sundararajan; M. Omair Ahmad, both of Department of Electrical and Computer Engineering, Concordia University, 1455 de Maisonneuve West, Room H915, Montreal, Quebec, Canada, H3C 1M8; M. N. Srikanta Swamy, Department of Electrical and Computer Engineering, Concordia University, 1444 de Maisonneuve Blvd., W., Montreal, Quebec, Canada, H3G 1M8

[21] Appl. No.: 996,561

[22] Filed: Dec. 24, 1992

[51] Int. Cl.$^5$ ............................................. G06F 15/332
[52] U.S. Cl. ............................................. 364/726
[58] Field of Search ......................................... 364/726

[56] References Cited

U.S. PATENT DOCUMENTS

| | | | |
|---|---|---|---|
| 4,275,452 | 6/1981 | White | 364/726 |
| 4,344,151 | 8/1982 | White | 364/726 |
| 4,689,762 | 8/1987 | Thibodeau, Jr. | 364/726 |

*Primary Examiner*—David H. Malzahn

[57] ABSTRACT

Since the invention of the radix-2 structure for the computation of the discrete Fourier transform (DFT) by Cooley and Tukey in 1965, the DFT has been widely used for the frequency-domain analysis and design of signals and systems in communications, digital signal processing, and in other areas of science and engineering. While the Cooley-Tukey structure is simpler, regular, and efficient, it has some drawbacks such as more complex multiplications than required by higher-radix structures, and the overhead operations of bit-reversal and data-swapping. The present invention provides a large family of radix-2 structures for the computation of the DFT of a discrete signal of N samples. A member of this set of structures is characterized by two parameters, u and v, where u ($u = 2^r$, $r = 1, 2, \ldots, (\log_2 N) - 1$) specifies the size of each data vector applied at the two input nodes of a butterfly and v represents the number of consecutive stages of the structure whose multiplication operations are merged partially or fully. It is shown that the nature of the problem of computing the DFT is such that the sub-family of the structures with $u = 2$ suits best for achieving its solution. These structures have the features that eliminate or reduce the drawbacks of the Cooley-Tukey structure while retaining its simplicity and regularity. A comprehensive description of the two most useful structures from this sub-family along with their hardware implementations is presented.

5 Claims, 21 Drawing Sheets

COMPUTATIONAL STRUCTURES FOR THE FAST FOURIER TRANSFORM ANALYZERS

BACKGROUND OF THE INVENTION

1. Field of the Invention The present invention is related to improved fast-Fourier-transform (FFT) analyzers. It is directed to both the butterfly circuits and the interconnection of the butterfly circuits to form FFT analyzers.

2. Description of the Prior Art

The use of the discrete Fourier transform (DFT) for the frequency-domain analysis and design of signals and systems came into widespread use after the publication of the paper "An Algorithm for the Machine Calculation of Complex Fourier Series, in" *Math. Computation.*, vol. 19, April 1965, pp. 297–301 by Cooley, J. W. and Tukey, J. W. describing, in general, the decomposition of an N-point DFT into a number of DFTs of a smaller size and, in particular, the radix-2 decimation-in-time (DIT) algorithm. The radix-2 decimation-infrequency (DIF) algorithm was reported later by Gentleman, W. M. and Sande, G. in "Fast Fourier Transforms-for Fun and Profit," in *Proc. AFIPS, Joint Computer Conf.*, vol. 29, 1966, pp. 563–578. However, both the DIT and DIF algorithms, in general, are referred to as Cooley-Tukey algorithms. A detailed description and the history of the development of these algorithms can be found in Special Issue on FFT and Applications, *IEEE Trans. Audio Electroacoust.*, vol. AU-15, June 1967. Despite the subsequent development of other algorithms, it is the Cooley-Tukey radix-2 algorithm that has been most widely used as presented originally without any significant changes, due to the simplicity, regularity, and efficiency of the resulting computational structure. A drawback of the computational structure of the Cooley-Tukey radix-2 algorithm is that it requires more complex multiplications compared with that of the higher-radix algorithms. In addition, this structure has the overheads of bit-reversal and data-swapping operations. This disclosure reports the invention of a large set of computational structures, designated as plus-minus (PM) structures, derived from a new family of radix-2 algorithms, designated as the plus-minus (PM) algorithms.

SUMMARY OF THE INVENTION

The Cooley-Tukey computational structure based on the radix-2 algorithm uses a divide-and-conquer strategy to decompose the problem of computing an N-point DFT into a number of sub-problems of computing 2-point DFTs each characterized by a basic computational process commonly known as the butterfly operation. Each of the input and output nodes of a butterfly has only one data value. Therefore, a single butterfly computes only one 2-point transform. However, it is possible to design a large number of radix-2 computational structures by making the input data to each node of a basic computational unit a vector rather than a scalar. The computational structures of the present invention are developed from this observation.

Since a 2-point transform is computed with one data value from each of the two input nodes of the butterfly, the existence of more than one data value (i.e., the elements of a vector) at each node implies the computation of two or more 2-point transforms by each butterfly. The u-element vector formation from the raw given data is carried out by computing u-point DFTs in a preprocessing structure (the first part of the PM structure). The computational structures derived from the PM family of radix-2 algorithms handle the data values as vectors with 2 or more elements and compute more than one 2-point DFTs in each butterfly of the second part of the structure.

DESCRIPTION OF THE PREFERRED EMBODIMENTS

Figure 1:
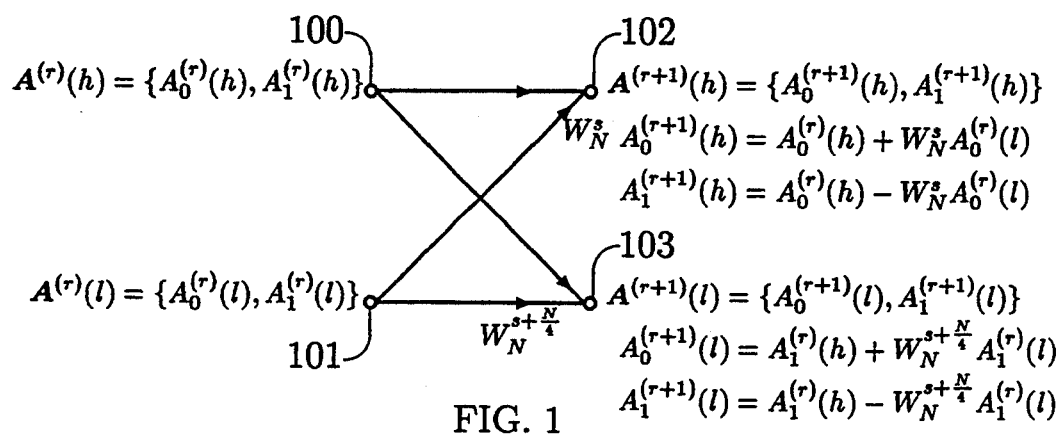
FIG. 1. The butterfly of the $2 \times 1$ PM DIT DFT structure. Two of the twiddle factors assume a value of 1, whereas the other two differ by a factor of $W_N^{N/4}$.

Each member of the set of computational structures of the present invention is designated hereafter as $u \times v$ PM structure and the algorithm through which it is derived is designated as $u \times v$ PM algorithm. The letter u indicates the length of the input vectors to a butterfly.

It is a power of 2 with a positive integer exponent in the range 1 to $M-1$ (In this disclosure it is assumed that N, the number of samples in the input data set, is equal to an integral power of 2 i.e., $M=\log_2 N$ is a positive integer.). It is possible to combine fully or partially the multiplication operations of two or more consecutive stages in the PM structures in order to reduce the total number of multiplication operations. The letter v, in the range 1 to $(M-\log_2 u)$, specifies the number of stages whose multiplications are combined.

The decomposition process of the computation of an N-point DFT into 2-point DFTs requires the incorporation of the vectorization process in the definition of the DFT. Starting from the definition of the DFT, we present an equivalent vectorized format for any value of u.

The DFT of a data sequence $\{x(n), n=0,1,\ldots,N-1\}$ is defined as $$X(k) = \sum_{n=0}^{N-1} x(n) W_N^{nk}, \quad k = 0,1,\ldots,N-1, \tag{1}$$

where $$W_N = \exp\left(-j\frac{2\pi}{N}\right).$$

For a positive integer u as defined earlier, (1) can be rewritten as $$X(k) = \left\{ x(0) + x\left(1\frac{N}{u}\right) W_N^{1k\frac{N}{u}} + \ldots + x\left((u-1)\frac{N}{u}\right) W_N^{(u-1)k\frac{N}{u}} \right\} W_N^{0k} \tag{2}$$

$$+ \left\{ x(1) + x\left(1 + 1\frac{N}{u}\right) W_N^{1k\frac{N}{u}} + \ldots + x\left(1 + (u-1)\frac{N}{u}\right) W_N^{(u-1)k\frac{N}{u}} \right\} W_N^{1k} +$$

$$\vdots$$

$$+ \left\{ x\left(\frac{N}{u}-1\right) + x\left(2\frac{N}{u}-1\right) W_N^{1k\frac{N}{u}} + \ldots + x\left(u\frac{N}{u}-1\right) W_N^{(u-1)k\frac{N}{u}} \right\} W_N^{(\frac{N}{u}-1)k}.$$

Since $$W_N^{\frac{N}{u}} = W_u^1, \tag{2}$$

can be expressed as $$X(k) = \left\{ x(0) + x\left(1\frac{N}{u}\right) W_u^{1k} + \ldots + x\left((u-1)\frac{N}{u}\right) W_u^{(u-1)k} \right\} W_N^{0k} \tag{3}$$

$$+ \left\{ x(1) + x\left(1 + 1\frac{N}{u}\right) W_u^{1k} + \ldots + x\left(1 + (u-1)\frac{N}{u}\right) W_u^{(u-1)k} \right\} W_N^{1k} +$$

$$\vdots$$

$$+ \left\{ x\left(\frac{N}{u}-1\right) + x\left(2\frac{N}{u}-1\right) W_u^{1k} + \ldots + x\left(u\frac{N}{u}-1\right) W_u^{(u-1)k} \right\} W_N^{(\frac{N}{u}-1)k}.$$

Note that the expressions inside each pair of braces is a u-point DFT and when evaluated will give rise to u distinct values for $k=0,1,\ldots,u-1$. Let $$a(n)\left( n = 0, 1, \ldots, \frac{N}{u} - 1 \right)$$

denote vectors, each consisting of u-elements (Vectors will be denoted by boldfaced letters). The vector $a(n)$ consists of the nth u-point transform values $a_q(n)(q=0,1,\ldots,u-1)$ as defined below.

$$a(n) = \{a_0(n), a_1(n), \ldots, a_{u-1}(n)\} = \tag{4}$$

$$\left\{ \text{values of the } u\text{-point } DFT \text{ of} \left\{ x\left(n + 0\frac{N}{u}\right), \right.\right.$$

$$\left.\left. x\left(n + 1\frac{N}{u}\right), \ldots, x\left(n + (u-1)\frac{N}{u}\right) \right\} \right\},$$

$$n = 0, 1, \ldots, \frac{N}{u} - 1.$$

Therefore, (3) can be rewritten as $$X(k) = \tag{5}$$

$$a_q(0) W_N^{0k} + a_q(1) W_N^k + \ldots + a_q\left(\frac{N}{u} - 1\right) W_N^{(\frac{N}{u}-1)k} =$$

$$\sum_{n=0}^{\frac{N}{u}-1} a_q(n) W_N^{nk}, \quad k = 0, 1, \ldots, N-1.$$

Since the values of the u-point transform $a_q(n)$ are periodic with a period of u, for values of k equal to or greater than u in (5), the values $a_q(n)$ repeat. Therefore, $$q = k \bmod u.$$

Replacing the argument $$k \text{ by } k + p\frac{N}{u}$$

in (5) and (6) yields $$X\left(k + p\frac{N}{u}\right) = a_q(0) W_N^{0(k+p\frac{N}{u})} + \quad (7)$$

$$a_q(1) W_N^{1(k+p\frac{N}{u})} + \ldots + a_q\left(\frac{N}{u} - 1\right) W_N^{(\frac{N}{u}-1)(k+p\frac{N}{u})},$$

$$k = 0, 1, \ldots, \frac{N}{u} - 1, \, p = 0, 1, \ldots, u - 1$$

$$q = \left(k + p\frac{N}{u}\right) \bmod u. \quad (8)$$

Let us vectorize the output transform values X(k) as $$A(k) = \{A_0(k), A_1(k), \ldots, A_{u-1}(k)\} = \quad (9)$$

$$\left\{ X\left(k + p\frac{N}{u}\right), p = 0, 1, \ldots, u - 1 \right\},$$

$$k = 0, 1, \ldots, \frac{N}{u} - 1.$$

Therefore, (7) can be expressed as $$A_p(k) = a_q(0) W_N^{0k} (W_N^{\frac{N}{u}})^{0p} + a_q(1) W_N^{1k} (W_N^{\frac{N}{u}})^{1p} + \ldots + \quad (10)$$

$$a_q\left(\frac{N}{u} - 1\right) W_N^{(\frac{N}{u}-1)k} (W_N^{\frac{N}{u}})^{(\frac{N}{u}-1)p} = a_q(0) W_N^{0k} (W_u^1)^{0p} +$$

$$a_q(1) W_N^{1k} (W_u^1)^{10} + \ldots + a_q\left(\frac{N}{u} - 1\right) W_N^{(\frac{N}{u}-1)k} (W_u^1)^{(\frac{N}{u}-1)p}.$$

With the vectorization of the input quantities x(n) as carried out in (4) and the output quantities X(k) as carried out in (9) and from (10), the DFT as defined by (1) can be equivalently written as $$A_p(k) = \sum_{n=0}^{\frac{N}{u}-1} (W_u^1)^{pn} a_q(n) W_N^{nk}, \, k = 0, 1, \ldots, \frac{N}{u} - 1 \quad (11)$$

where $$q = \left(k + p\frac{N}{u}\right)$$

mod u and u and p=0,1,...,u−1. Thus, the PM structures must have a part in which u-element vectors are formed by implementing u-point transforms.

The inverse DFT (IDFT) is given by $$x(n) = \frac{1}{N} \sum_{k=0}^{N-1} X(k) W_N^{-nk}, \, n = 0, 1, \ldots, N - 1. \quad (12)$$

A set of expressions similar to those given by (4), (9), and (11) can be obtained for the case of IDFT. The input quantities X(k) are vectorized as $$B(k) = \{B_0(k), B_1(k), \ldots, B_{u-1}(k)\} = \quad (13)$$

{values of the u-point IDFT of $\left\{ X\left(k + 0\frac{N}{u}\right), \right.$ $$\left. X\left(k + 1\frac{N}{u}\right), \ldots, X\left(k + (u-1)\frac{N}{u}\right) \right\} \right\},$$

$$k = 0, 1, \ldots, \frac{N}{u} - 1.$$

The output data values x(n) are vectorized as $$b(n) = \{b_0(n), b_1(n), \ldots, b_{u-1}(n)\} = \quad (14)$$

$$\left\{ x\left(n + p\frac{N}{u}\right), p = 0, 1, \ldots, u - 1 \right\}$$

$$n = 0, 1, \ldots, \frac{N}{u} - 1.$$

An expression similar to (11) for computing the IDFT can be obtained from (12) using (13) and (14) as $$b_p(n) = \frac{u}{N} \sum_{k=0}^{\frac{N}{u}-1} (W_u^{-1})^{pk} B_q(k) W_N^{-nk}, \, n = 0, 1, \ldots, \frac{N}{u} - 1 \quad (15)$$

where $$q = \left(n + p\frac{N}{u}\right)$$

mod u and p=0,1,...,u−1.

In the subset of the computational structures with u=2, data samples are organized as 2-element vectors. For the specific value of u=2, (4), (9), and (11) become, respectively, $$a(n) = \{a_0(n) \, a_1(n)\} = \quad (16)$$

$$\left\{ x(n) + x\left(n + \frac{N}{2}\right), x(n) - x\left(n + \frac{N}{2}\right) \right\},$$

$$n = 0, 1, \ldots, \frac{N}{2} - 1$$

$$A(k) = \{A_0(k), A_1(k)\} = \left\{ X(k), X\left(k + \frac{N}{2}\right) \right\}, \quad (17)$$

$$k = 0, 1, \ldots, \frac{N}{2} - 1$$

$$A_p(k) = \sum_{n=0}^{\frac{N}{2}-1} (-1)^{pn} a_q(n) W_N^{nk}, \, k = 0, 1, \ldots, \frac{N}{2} - 1 \quad (18)$$

where p=0 or 1 represents the first or the second element, respectively, of the output vector A(k), and q=k mod 2, N>2

Similarly, in the case of IDFT, for u=2, (13), (14), and (15) become, respectively, as $$B(k) = \{B_0(k), B_1(k)\} = \quad (19)$$

$$\left\{ X(k) + X\left(k + \frac{N}{2}\right), X(k) - X\left(k + \frac{N}{2}\right) \right\},$$

$$k = 0, 1, \ldots, \frac{N}{2} - 1.$$

Note that the process of forming the vectors B(k) differs from the one using (12), in that the values are not divided by 2, the value of the divisor N outside the summation in (12). This is done to avoid the division by a constant more than once.

$$b(n) = \{b_0(n), b_1(n)\} = \left\{ x(n), x\left(n + \frac{N}{2}\right) \right\}, \quad (20)$$

$$n = 0, 1, \ldots, \frac{N}{2} - 1$$

$$b_p(n) = \frac{1}{N} \sum_{k=0}^{\frac{N}{2}-1} (-1)^{pk} B_q(k) W_N^{-nk}, \, n = 0, 1, \ldots, \frac{N}{2} - 1 \quad (21)$$

where p=0 or 1 represents the first or the second element, respectively, of the output vector b(n), and $$q = n \bmod 2, \, N > 2$$

Equations (18) and (21) can have direct hardware or software implementation to compute the DFT and IDFT, respectively. The decomposition of these equations can be expected to yield faster and more efficient computational structures. Therefore, the procedure for the decomposition of these equations and the derived structures will be presented in detail in the following sections. The procedure of obtaining the computational structures for the parameter values of u>2 follow along the same lines. It should be noted that the number of array-index updatings in the PM structures will be proportional to N/u due to the vectorization of the data samples.

The 2×1 PM DIT computational structure to compute the DFT for complex-valued input data is derived by decomposing (18) corresponding to a number of computational stages where the multiplication operations of consecutive stages are not combined. Decomposition of (18) corresponding to the even-indexed and the odd-indexed input samples $a_q(n)$ yields $$A_p(k) = \sum_{n=0}^{\frac{N}{4}-1} (-1)^{p(2n)} a_q(2n) W_N^{2nk} + \quad (22)$$

$$\sum_{n=0}^{\frac{N}{4}-1} (-1)^{p(2n+1)} a_q(2n+1) W_N^{(2n+1)k}.$$

Since $(-1)^{p(2n)} = 1$ and $W_N^{2nk} = W_{N/2}^{nk}$, (22) can be rewritten as $$A_p(k) = \sum_{n=0}^{\frac{N}{4}-1} a_q(2n) W_{\frac{N}{2}}^{nk} + (-1)^p W_N^k \sum_{n=0}^{\frac{N}{4}-1} a_q(2n+1) W_{\frac{N}{2}}^{nk}. \quad (23)$$

The output transform $$A_p\left(k + \frac{N}{4}\right)$$

which is N/4 samples ahead of the kth sample $A_p(k)$, can be obtained by replacing k by $$k + \frac{N}{4}$$

in (23). The resulting equation, by noting that $W_N^{N/4} = -j$ and $W_{N/2}^{N/4} = -1$, can be written as.

$$A_p\left(k + \frac{N}{4}\right) = \sum_{n=0}^{\frac{N}{4}-1} (-1)^n a_q(2n) W_{\frac{N}{2}}^{nk} + \quad (24)$$

$$(-1)^p (-j) W_N^k \sum_{n=0}^{\frac{N}{4}-1} (-1)^n a_q(2n+1) W_{\frac{N}{2}}^{nk}.$$

$$k = 0, 1, \ldots, \frac{N}{4} - 1.$$

Using (18), the transform of the N/4 even-indexed input samples $a_q(n)$, represented by $A_0^e(k)$ and $A_1^e(k)$, respectively, is given by $$A_0^e(k) = \sum_{n=0}^{\frac{N}{4}-1} a_q(2n) W_{\frac{N}{2}}^{nk}$$

and $$A_1^e(k) = \sum_{n=0}^{\frac{N}{4}-1} (-1)^n a_q(2n) W_{\frac{N}{2}}^{nk},$$

and the transform of the N/4 odd-indexed input samples $a_q(n)$, represented by $A_0^o(k)$ and $A_1^o(k)$ respectively, is given by $$A_0^o(k) = \sum_{n=0}^{\frac{N}{4}-1} a_q(2n+1) W_{\frac{N}{2}}^{nk}$$

and $$A_1^o(k) = \sum_{n=0}^{\frac{N}{4}-1} (-1)^n a_q(2n+1) W_{\frac{N}{2}}^{nk}$$

where $$k = 0, 1, \ldots, \frac{N}{4} - 1.$$

Now (23) and (24), using the smaller size transforms given above, can be written as $$A_p(k) = A_0^e(k) + (-1)^p W_N^k A_0^o(k) \quad (25)$$

and $$A_p\left(k + \frac{N}{4}\right) = A_1^e(k) + (-1)^p(-j)W_N^k A_1^o(k) \quad (26)$$

where $$k = 0, 1, \ldots, \frac{N}{4} - 1.$$

From (25) and (26), we see that in order to compute the transform values $A_p(k)$ and $$A_p\left(k + \frac{N}{4}\right),$$

the precomputation of $A_0^e(k)$ and $A_1^e(k)$, and $A_0^o(k)$ and $A_1^o(k)$ is required. Thus, the problem of computing N-point DFT has been decomposed into a problem of computing two N/2-point DFTs. This process of decomposition can be continued. In general, the relations governing the basic computation at the rth stage can be deduced from (25) and (26) as $$A_0^{(r+1)}(h) = A_0^{(r)}(h) + A_0^{(r)}(l)W_N^s$$
$$A_1^{(r+1)}(h) = A_0^{(r)}(h) + A_0^{(r)}(l)W_N^s$$

$$A_0^{(r+1)}(l) = A_0^{(r)}(h) + A_0^{(r)}(l)W_N^{s + \frac{N}{4}}$$

$$A_1^{(r+1)}(l) = A_0^{(r)}(h) + A_0^{(r)}(l)W_N^{s + \frac{N}{4}}$$

where s is an integer whose value depends on the stage of computation r and the index h. These equations characterize the input-output relations of a butterfly, the basic computing unit, shown in FIG. 1. These equations represent two 2-point DFTs after the input values indexed with l are multiplied with appropriate twiddle factors. In the general case, each butterfly of the PM structures compute u 2-point transforms. In FIG. 1, two input ports of the butterfly are marked 100 and 101. Two output ports of the butterfly are marked 102 and 103.

Figure 2:
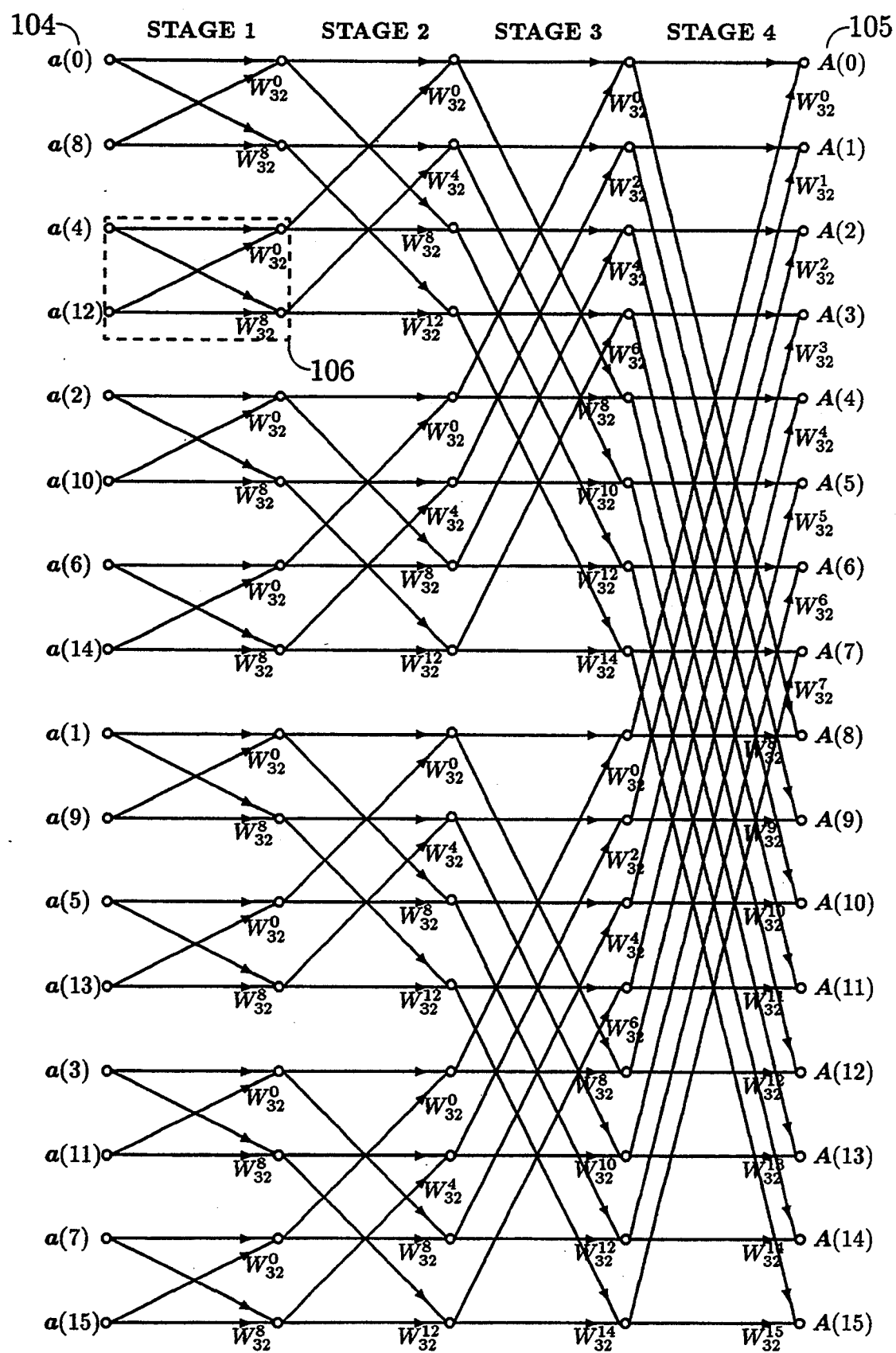
FIG. 2. The flowchart of the $2 \times 1$ PM DIT DFT structure for complex-valued input data with N=32.

Repeated use of (25) and (26) yields the flowchart of the computational structure for a specific value of N. The set of butterflies for the last stage is found by allowing k to vary from 0 to $$\frac{N}{4} - 1$$

in (25) and (26). The output vectors of the preceding stage are split into two sets of N/4-vector DFTs. The set of butterflies for each of the two independent sets of this stage is found by allowing k to vary from 0 to $$\frac{N}{8} - 1$$

in equations obtained from (25) and (26) by replacing N by N/2. As seen from (25) and (26) (which correspond to the last stage), h and l of the general butterfly differ by a number that ranges from 1 in the first stage to $N/2^u$ in the last stage. The process of decomposition stops when the size of the transforms reduces to two vectors. The flowchart of the 2×1 PM DIT DFT computational structure for N=32 is shown in FIG. 2. One of the butterflies that makes this structure is shown in dashed box 106. Reference numeral 104 indicates an input vector with index zero and reference numeral 105 indicates an output vector with index zero.

The 2×1 PM DIT structure for computing IDFT can be obtained by decomposing (21) in a similar way. The process will lead to relations similar to (25) and (26) with the sign of the exponents of $W_N$ negated and $-j$ replaced by j. Finally, each output data vector component $b_q(n)$ is divided by N.

The 2×1 PM DIF computational structure to compute the DFT for complex-valued input data is derived by decomposing (18) corresponding to a number of computational stages where the multiplication operations of consecutive stages are not combined. Decomposition of (18) corresponding to the first-half and the second-half of the input samples $a_q(n)$ yields $$A_p(k) = \sum_{n=0}^{\frac{N}{4}-1} (-1)^{pn} a_q(n) W_n^{nk} + \sum_{n=\frac{N}{4}}^{\frac{N}{2}-1} (-1)^{pn} a_q(n) W_N^{nk} \quad (27)$$

Replacing n by $$n + \frac{N}{4}$$

in the second summation of the right side of (27) gives $$A_p(k) = \sum_{n=0}^{\frac{N}{4}-1} (-1)^{pn} a_q(n) W_n^{nk} + \quad (28)$$

$$\sum_{n=0}^{\frac{N}{4}-1} (-1)^{p(n+\frac{N}{4})} a_q\left(n + \frac{N}{4}\right) W_n^{(n+\frac{N}{4})k}$$

The pair of summations in (28) can be combined into a single one, giving $$A_p(k) = \quad (29)$$

$$\sum_{n=0}^{\frac{N}{4}-1} (-1)^{pn} \left\{ a_q(n) + (-1)^p \frac{N}{4}(-j)^k a_q\left(n + \frac{N}{4}\right) \right\} W_N^{nk}$$

The even-indexed and odd-indexed transform values $A_p(k)$ are readily obtained from (29) by replacing k by 2k and k by 2k+1, respectively, as $$A_p(2k) = \quad (30)$$

$$\sum_{n=0}^{\frac{N}{4}-1} (-1)^{pn} \left\{ a_0(n) + (-1)^p \frac{N}{4}(-j)^k a_0\left(n + \frac{N}{4}\right) \right\} W_{\frac{N}{2}}^{nk}$$

and $$A_p(2k+1) = \quad (31)$$

$$\sum_{n=0}^{\frac{N}{4}-1} (-1)^{pn} \left\{ a_1(n) + (-1)^p \frac{N}{4}(-j)^k a_1\left(n + \frac{N}{4}\right) \right\} W_N^n W_{\frac{N}{2}}^{nk}$$

where $$k = 0, 1, \ldots, \frac{N}{4} - 1.$$

Figure 3:
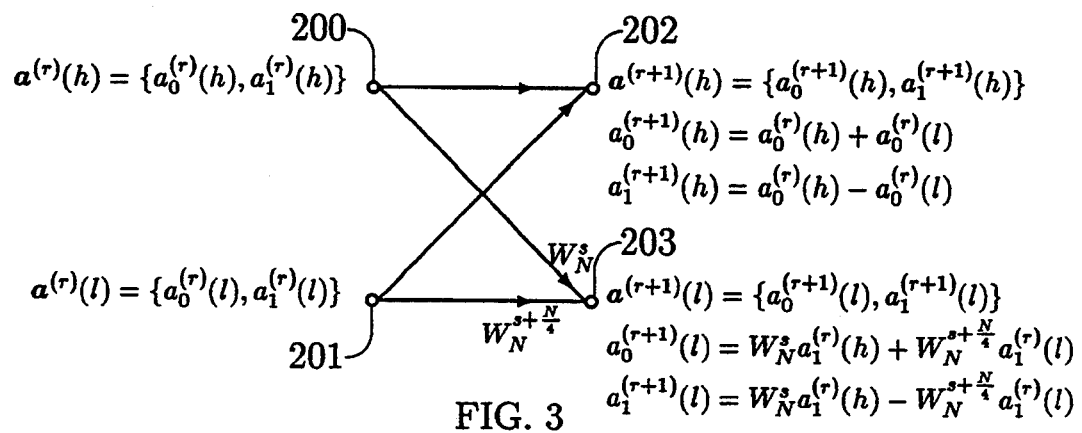
FIG. 3. The butterfly of the $2 \times 1$ PM DIF DFT structure. Two of the twiddle factors assume a value of 1, whereas the other two differ by a factor of $W_N^{N/4}$.

From (30) and (31), we see that the input values $a_q(n)$ and $$a_q\left(n + \frac{N}{4}\right)$$

are combined to reduce the problem size. The problem of computing an N-point DFT, therefore, has been decomposed into a problem of computing two N/2-point DFTs. This process of decomposition can be continued. In general, the relations governing the basic computation at the rth stage can be deduced from (30) and (31) as $$a_0^{(r+1)}(h) = a_0^{(r)}(h) + a_0^{(r)}(l)$$
$$a_1^{(r+1)}(h) = a_0^{(r)}(h) + a_0^{(r)}(l)$$

$$a_0^{(r+1)}(l) = a_0^{(r)}(h)W_N^s + a_1^{(r)}(l)W_N^{s+\frac{N}{4}}$$

$$a_1^{(r+1)}(l) = a_0^{(r)}(h)W_N^s + a_1^{(r)}(l)W_N^{s+\frac{N}{4}}$$

where s is an integer whose value depends on the stage of computation r and the index h. These equations characterize the input-output relations of a butterfly, the basic computing unit, shown in FIG. 3. In FIG. 3, two input ports of the butterfly are marked 200 and 201. Two output ports of the butterfly are marked 202 and 203.

Figure 4:
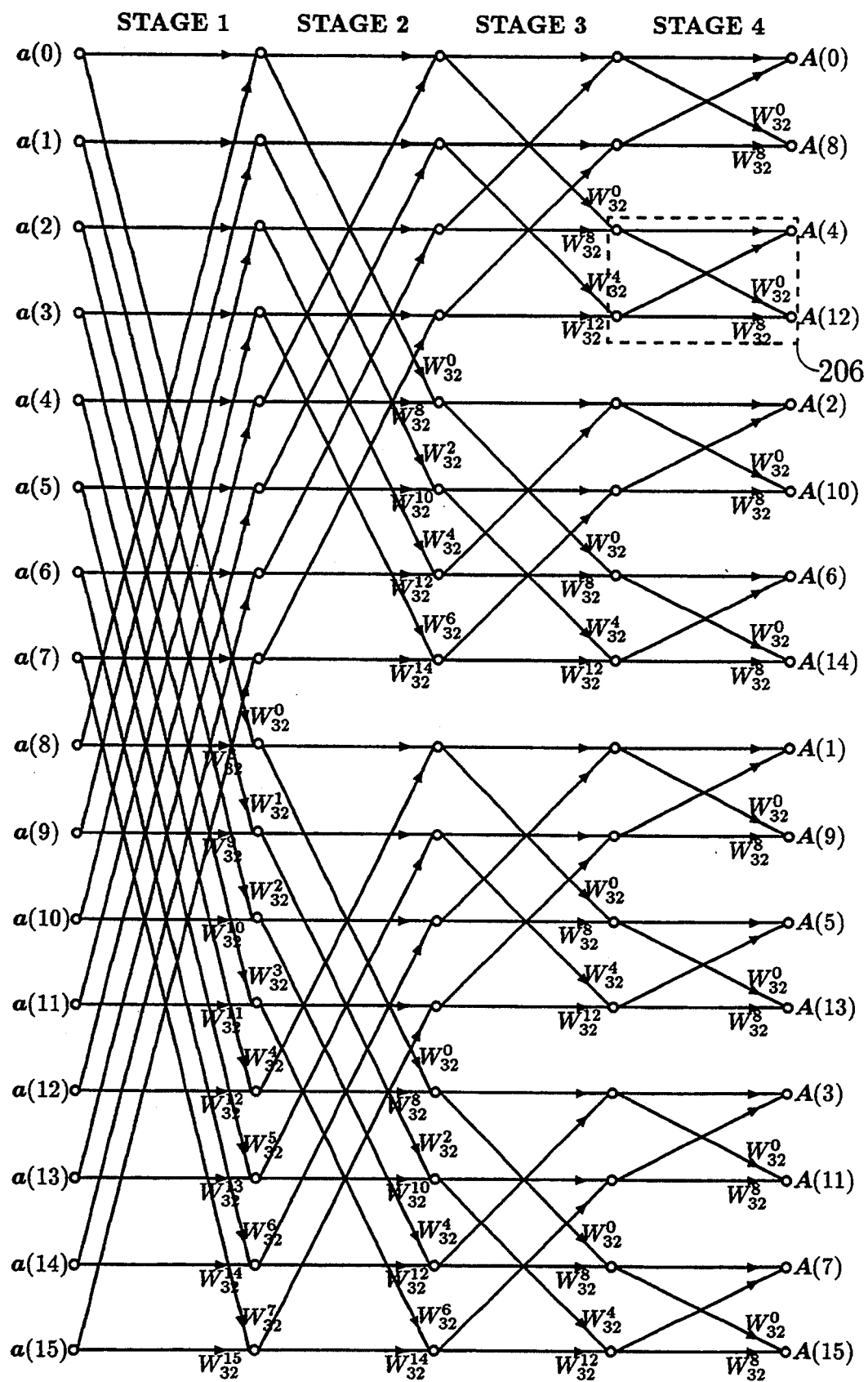
FIG. 4. The flowchart of the $2 \times 1$ PM DIF DFT structure for complex-valued input data with N=32.

Repeated use of (30) and (31) yields the flowchart of the computational structure for a specific value of N. The set of butterflies for the first stage is found by allowing k to vary from 0 to $$\frac{N}{4} - 1$$

in (30) and (31). The input vectors of the succeeding stage are split into two sets of N/4-vector DFTs. The set of butterflies for each of the two independent sets for this stage is found by allowing k to vary from 0 to $$\frac{N}{8} - 1$$

in equations obtained from (30) and (31) by replacing N by N/2. The process of decomposition stops when the size of the transforms reduces to two vectors. The flowchart of the 2×1 PM DIF DFT computational structure for N=32 is shown in FIG. 4. One of the butterflies that makes this structure is shown in dashed box 206.

The 2×1 PM DIF structure for computing IDFT can be obtained by decomposing (21) in a similar way. The process will lead to relations similar to (30) and (31) with the sign of the exponents of $W_N$ negated and $-j$ replaced by j. Finally, each output data vector component $b_q(n)$ is divided by N.

Figure 5:
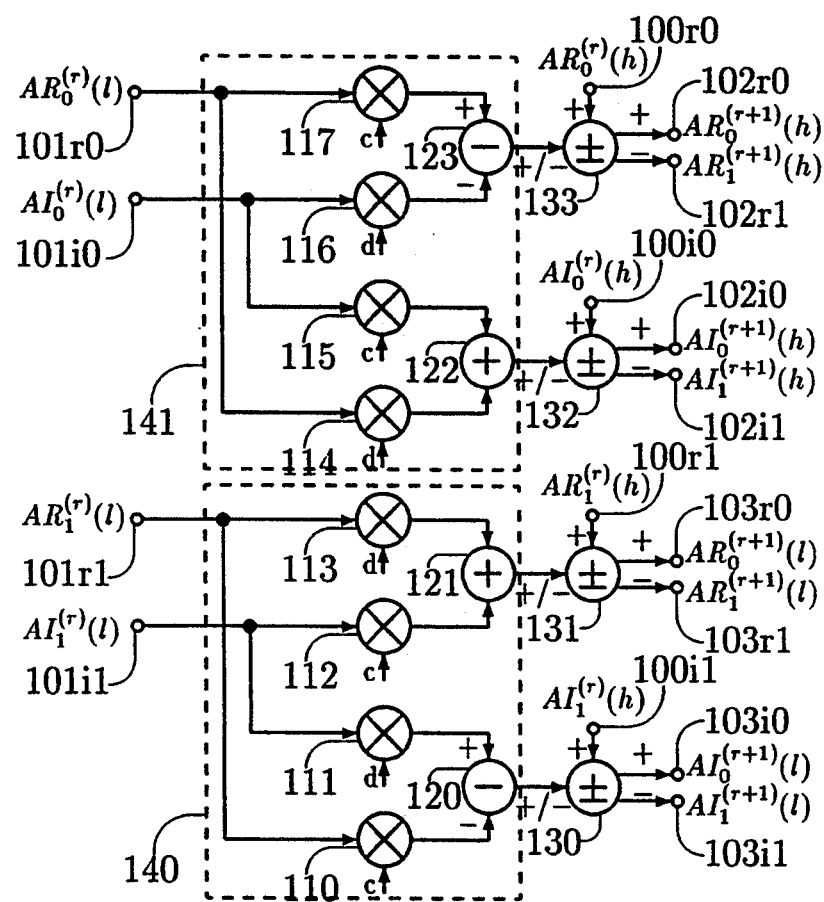
FIG. 5. The hardware realization of the butterfly of the $2 \times 1$ PM DIT DFT structure.

FIG. 5 shows a possible hardware realization of the butterfly of the 2×1 PM DIT DFT structure. Several of these units can be used, and in the ultimate realization all the stages can be realized with complete hardware without any software at all. For the sake of discussion, assume that only one butterfly is available in a computing system as part of an arithmetic unit. The butterfly unit could be made for different precisions and types of arithmetics. The butterfly essentially consists of four basic arithmetic units: multipliers, adders, subtrax:tots, and plus-minus units. Reference numerals 110, 111, 112, 113, 114, 115, 116, and 117 indicate real multipliers. Reference numerals 121 and 122 indicate adders. Reference numerals 120 and 123 denote subtractors. Dashed boxes 140 and 141 point to complex multipliers. Reference numerals 130, 131, 132, and 133 indicate plus-minus units. The + and − symbols on a subtractor indicates the minuend and subtrahend, respectively. A plus-minus unit has a + input and a ± input and two outputs. The + output is simply the addition of the two inputs, whereas the − output is the difference of + and ± inputs. As the sum and the difference produced by the plus-minus units are stored in consecutive locations in the memory, both the results need only one destination address and can be efficiently moved to the memory as a long word. Each butterfly has two twiddle factors $W_N^s$ and $$W_N^{s+\frac{N}{4}}.$$

Assumming that $$W_N^s = c + jd, \ W_N^{s+\frac{N}{4}} = d - jc.$$

Note that the inputs to the butterfly are decomposed into their real and imaginary parts before they are applied to multiplier or plus-minus units. Similarly, the outputs from the butterfly are also in decomposed form. Specifically, $A_i^{(r)} = AR_i^{(r)} + jAI_i^{(r)}$, (i=0,1). The input ports of the butterfly for the real and imaginary parts of the first complex input signal are marked 100r0 and 100i0, respectively. For the second input signal, the ports are marked 100r1 and 100i1. For the third input signal, the ports are marked 101r0 and 101i0. For the fourth input signal, the ports are marked 101r1 and 101i1. The output ports of the butterfly for the real and imaginary parts of the first complex output signal are marked 102r0 and 102i0, respectively. For the second output signal, the ports are marked 102r1 and 102i1. For the third output signal, the ports are marked 103r0 and 103i0. For the fourth output signal, the ports are marked 103r1 and 103i1. The multipliers, the adders and subtractors, and the plus-minus units of a butterfly can be used as a three-stage pipeline architecture. For each cycle, one set of four complex-valued outputs are produced from four complex-valued input signals. Each stage of the pipeline is busy with the next set of data. The operation of the pipeline needs buffer units between the stages and control circuits that are not shown in FIG. 5.

Figure 6:
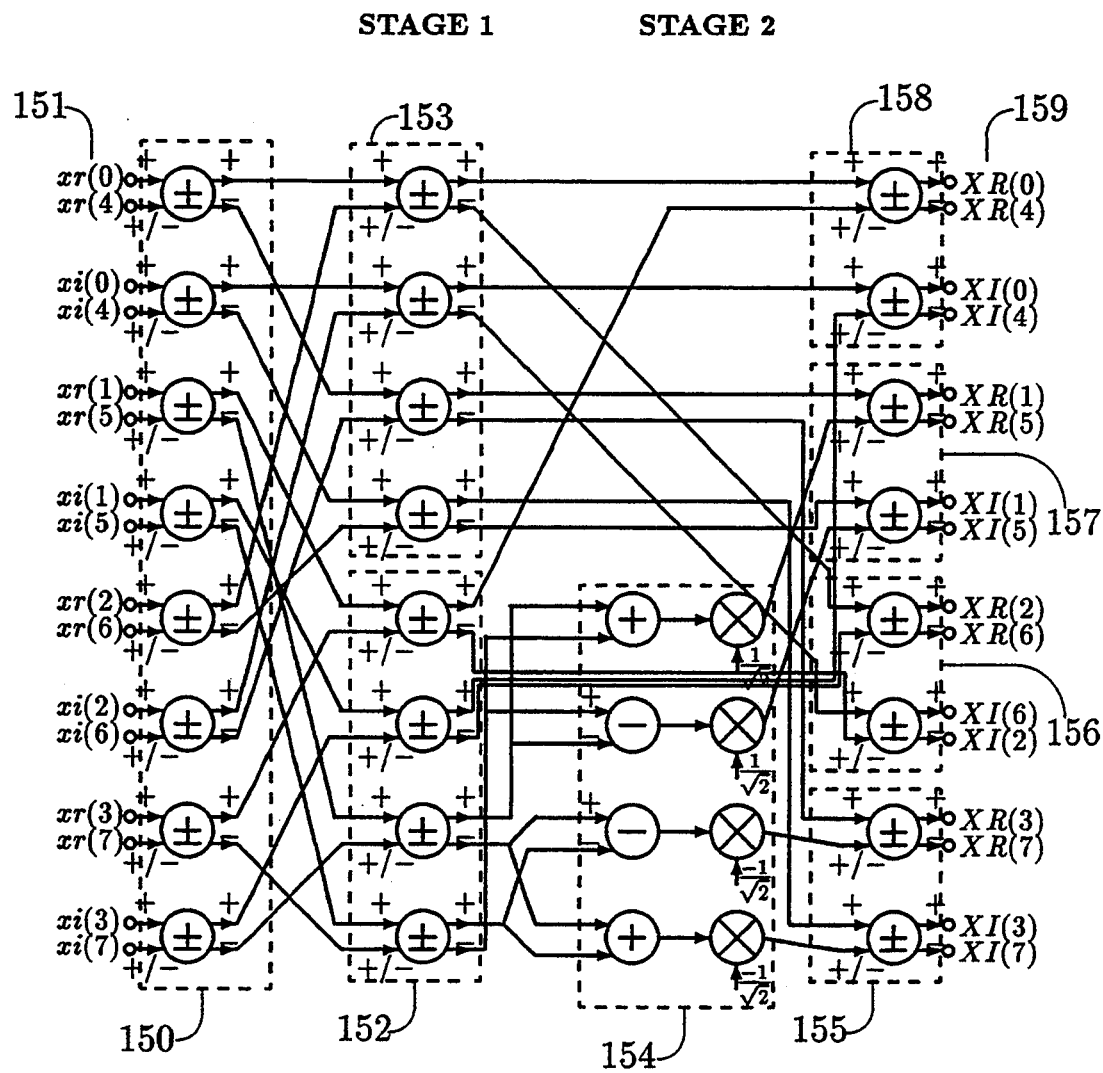
FIG. 6. The hardware realization of the $2 \times 1$ PM DIT DFT structure for complex-valued input data with N=8.

FIG. 6 shows the hardware realization of the 2×1 PM DIT DFT structure for complex-valued valued input data with N=8. The first part of structure marked 150 implements the 2-point transforms to form the vectors and the swapping of the date. The real part of the complex input signal indexed zero is marked 151. The real part of the complex output signal indexed zero is marked 159. The second part of the structure consists of two stages of butterflies. The first stage has no multiplier units as the twiddle factors for this stage are all either 1 or −j. Dashed boxes 152 and 153 are the two first stage butterflies. Dashed boxes 156 and 158 constitute the first butterfly of the second stage. Dashed boxes 154, 155 and 157 constitute the second butterfly of the second stage. The hardware realization for the 2×1 PM DIF structure will contain same number of multipliers, adders, etc., but the interconnections will be different.

The transform of a set of real-valued input data is Hermitian-symmetric, i.e., the real part of the transform is even symmetric and the imaginary part is odd symmetric. For an even N, the transform values X(0) and X.(N/2) are real-valued and distinct and $$X(k) = X^*(N - k), 1 \leq k \leq \frac{N}{2} - 1.$$

Therefore, for a specific value of N, only the first-half of the butterflies of each group of the computational structure corresponding to complex-valued data are computed during the computation of any stage. Due to this reason, the memory requirement is reduced by one half and the computation requirement is slightly less than one half of that of the structures for complex-valued input data. Therefore, the computational structure is similar to but only one half in size corresponding to complex-valued input data.

In the subset of the computational structures with u=2, data samples are organized as 2-element vectors. The storage of the vectors differs from that of the complex-valued data. For the specific value of u=2, vectors defined in (16) and (17) are modified, respectively, as $$a'(n) = \left\{ a(n), a\left(n + \frac{N}{4}\right) \right\} = \tag{32}$$

$$\left\{ \left( x(n) + x\left(n + \frac{N}{2}\right), x(n) - x\left(n + \frac{N}{2}\right) \right), \right.$$

$$\left\{ x\left(n + \frac{N}{4}\right) + x\left(n + \frac{3N}{4}\right) \right\},$$

$$\left. x\left(n + \frac{N}{4}\right) - x\left(n + \frac{3N}{4}\right) \right) \right\},$$

$$n = 0, 1, \ldots, \frac{N}{4} - 1$$

$$A'(0) = \tag{33}$$

$$\left\{ A(0), A_0\left(\frac{N}{4}\right) \right\} = \left\{ \left( X(0), X\left(\frac{N}{2}\right) \right), X\left(\frac{N}{4}\right) \right\},$$

$$A'(k) = \{A(k)\} = \left\{ X(k), X\left(k + \frac{N}{2}\right) \right\},$$

$$k = 1, 2, \ldots, \frac{N}{4} - 1.$$

Figure 7:
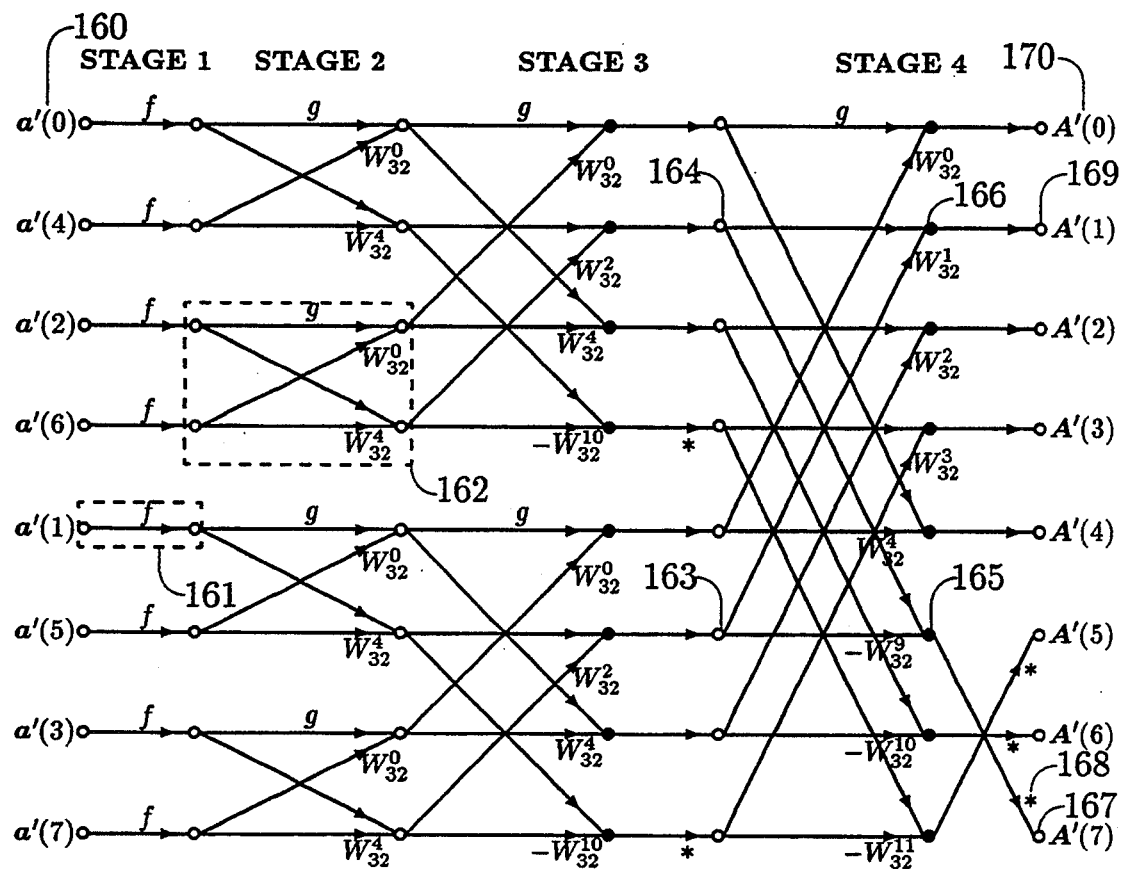
FIG. 7. The flowchart of the $2 \times 1$ PM DIT DFT structure for real-valued input data with N=32.

FIG. 7 shows the flowchart of the 2×1 PM DIT DFT computational structure for real-valued input data with N=32. Reference numeral 160 indicates an input vector indexed zero. Reference numeral 170 indicates an output vector indexed zero. Although the structure has the same number of stages as its complex-valued counterpart given in FIG. 2, there are some differences that must be noted. The number of butterflies in each stage is one half. In the first stage, 4-point transforms are computed by merging two 2-point transforms. As a vector contains two 2-point transforms, the four point transform is computed using the elements of a single vector. This operation in FIG. 7 is marked as f indicating the computation of a 4-point transform in the flowchart. A butterfly marked f is shown in dashed box 161. In the implementation, however, the vector formation, its scrambling, and the computation of the 4-point transform are all carried out at the same time. Since the first output vector has three transform values, the first butterflies in each group marked g is to be interpreted differently. A butterfly marked g is shown in dashed box 162. While the second vector is computed in a regular manner, the computation of the first vector consists of computing the first transform value and two others that are separated from it by one-quarter and one-half of the samples in the group. The other butterflies are similar to the structures of the complex-valued input data. Butterfly with ports marked 163, 164, 165 and 166 is one such butterfly. As only the first half of each group of butterflies in each stage corresponding to the structure for complex-valued data are computed, negation, swapping and conjugation operations must be carried out in order to get the first half of the output transform vectors. The conjugation operations are shown in FIG. 7 by the symbol * and one of them is marked 168. These operations are shown in FIG. 7 as post-extended operations of each stage, but in the implementation they are merged with the main stage and they do not pose any additional computational complexity. Butterfly with ports marked 163, 164, 167 and 169 constitute a butterfly for real data. The hardware implementation of the PM structures for real-valued input data for computing DFT is similar to PM DIT DFT structures for complex-valued input data with the differences as explained above.

While the redundancies due to real-valued data can be exploited in the development of either the DIT or the DIF structures, it is easier to implement the DFT computation using the DIT structure and implement the IDFT computation using the DIF structure.

In the case of IDFT, for the specific value of u=2, the vector definitions (19) and (20) are modified, respectively, as $$B'(0) = \left\{ B(0), B\left(\frac{N}{4}\right) \right\} = \tag{34}$$

$$\left\{ \left( X(0) + X\left(\frac{N}{2}\right), X(0) - X\left(\frac{N}{2}\right) \right), \right.$$

$$\left. \left( X\left(\frac{N}{4}\right) + X^*\left(\frac{N}{4}\right), X\left(\frac{N}{4}\right) - X^*\left(\frac{N}{4}\right) \right) \right\},$$

$$B'(k) = \{B(k)\} = \left\{ X(k) + X\left(k + \frac{N}{2}\right), \left( X\left(k + \frac{N}{2}\right) \right) \right\},$$

$$k = 1, 2, \ldots, \frac{N}{4} - 1$$

$$b'(n) = \left\{ b(n), b\left(n + \frac{N}{4}\right) \right\} = \tag{35}$$

$$\left\{ \left( x(n), x\left( n + \frac{N}{2} \right) \right), \left( x\left( n + \frac{N}{4} \right), x\left( n + \frac{3N}{4} \right) \right) \right\},$$

$$n = 0, 1, \ldots, \frac{N}{4} - 1.$$

Figure 8:
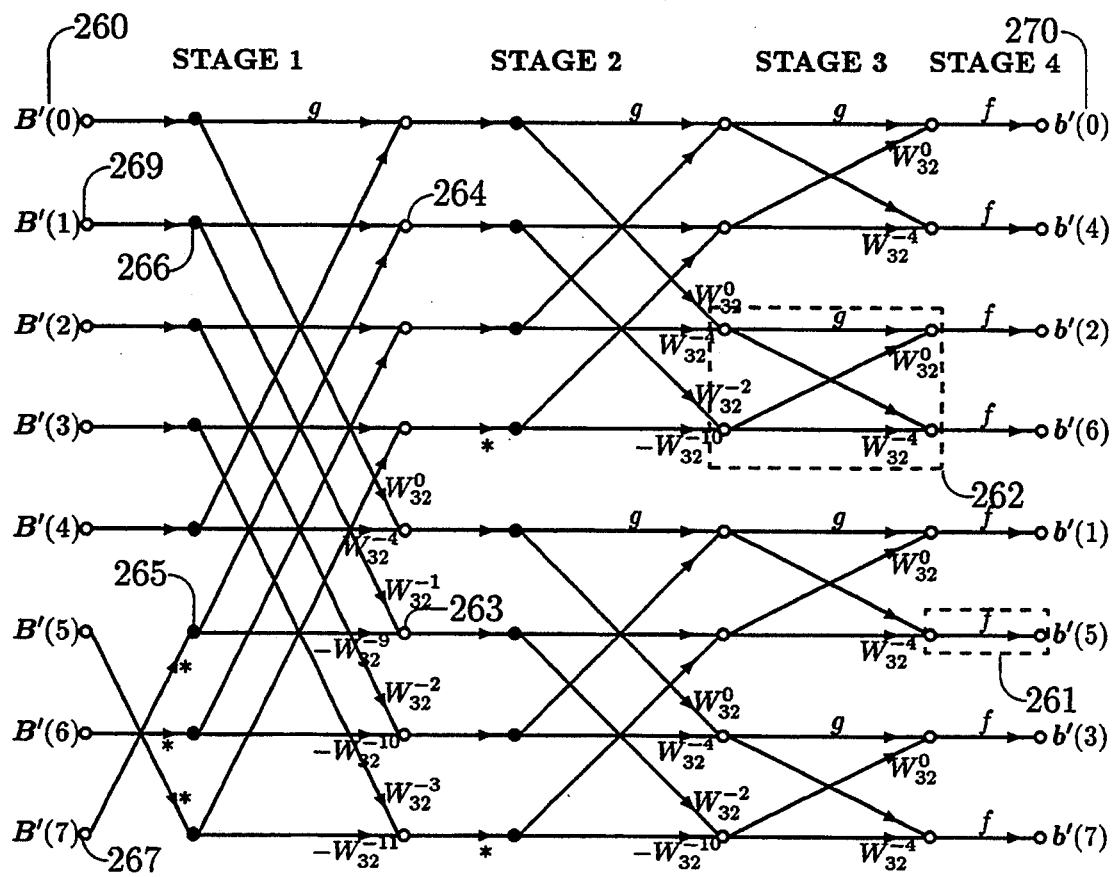
FIG. 8. The flowchart of the $2 \times 1$ PM DIF IDFT structure for the transform of real-valued data with N=32.

FIG. 8 shows the 2×1 PM DIF IDFT computation structure for the transform of real-valued data with N=32. Reference numeral 260 indicates an input vector indexed zero. Reference numeral 270 indicates an output vector indexed zero. In computing the IDFT, the input is always the first half of the vectors but the computation requires first quarter and third quarter of the input vectors. Therefore, similar to the forward transform, the conversion of the second quarter data into that of the third quarter data requires the operations of negation, data swapping, and conjugation. In the IDFT these operations are carried out before the butterfly operations of each stage, i.e., each stage is pre-extended. The conjugation and data swapping operations are shown in the pre-extended stages but they are combined with the butterfly operations without posing any additional computational complexity. Butterfly with ports marked 263, 264, 265 and 266 is similar to a complex butterfly. Butterfly with ports marked 263, 264, 267 and 269 is a butterfly for the transform of real data. Since the first vector has three real values and one imaginary value that are independent, the first butterfly marked g of each group must be interpreted differently. While the second vector is computed in the same manner as for the complex-valued data, the computation of the first vector consists of computing the first inverse transform value and three others that are separated from it by one-quarter, one-half, and three-quarter of the samples of each group. A butterfly marked g is shown in dashed box 262. In the last stage, two 2-point IDFTs are computed in a butterfly as usual. However, all the four input and output values are stored in a single vector and this operation is marked as f in FIG. 8. A butterfly marked f is shown in dashed box 261. This operation of this stage can be combined with the operations of scrambling and dividing the transform values by N. The hardware implementation of the PM structures for real-valued input data for computing IDFT is similar to PM DIF IDFT structures for complex-valued input data with the differences as explained above.

In the 2×2 PM structures the data values are 2-element vectors and the multiplication operations of each pair of adjacent stages are combined. To derive the 2×2 PM DIT structure for computing the DFT, consider the input-output relations (25) and (26) for the last stage of the 2×1 PM DIT structure, as given by $$A_p(k) = A_0^e(k) + (-1)^p (W_N^k A_0^o(k)) \tag{36}$$

and $$A_p\left( k + \frac{N}{4} \right) = A_1^e(k) + (-1)^p(-j)(W_N^k A_1^o(k)) \tag{37}$$

where $$k = 0, 1, \ldots, \frac{N}{4} - 1.$$

The output transform values $$A_p\left( k + \frac{N}{8} \right) \text{ and } A_p\left( k + \frac{3N}{8} \right)$$

which are N/8 samples ahead of those given by (36) and (37), respectively, can be obtained by replacing k by $$k + \frac{N}{8}$$

these equations and the resulting equations are given by $$A_p\left( k + \frac{N}{8} \right) = \tag{38}$$

$$A_0^e\left( k + \frac{N}{8} \right) + (-1)^p \left( W_N^{k + \frac{N}{8}} A_0^o\left( k + \frac{N}{8} \right) \right)$$

and $$A_p\left( k + \frac{3N}{8} \right) = \tag{39}$$

$$A_1^e\left( k + \frac{N}{8} \right) + (-1)^p (-j) \left( W_N^{k + \frac{N}{8}} A_1^o\left( k + \frac{N}{8} \right) \right)$$

where $$k = 0, 1, \ldots, \frac{N}{8} - 1.$$

The variables $A_q^e(i)$ and $A_q^o(i)$ $$\left( q = 0, 1,; i = k, k + \frac{N}{8} \right)$$

on the right side of (36) through (39) represent the output values of the previous stage. These values, in turn, can be obtained recursively as $$A_p^e(k) = A_0^{ee}(k) + (-1)^p W_N^{2k} A_0^{eo}(k), \tag{40}$$

$$A_p^e\left( k + \frac{N}{8} \right) = A_1^{ee}(k) + (-1)^p(-j) W_N^{2k} A_1^{eo}(k), \tag{41}$$

$$A_p^o(k) = A_0^{oe}(k) + (-1)^p W_N^{2k} A_0^{oo}(k), \tag{42}$$

and $$A_p^o\left( k + \frac{N}{8} \right) = A_1^{oe}(k) + (-1)^p(-j) W_N^{2k} A_1^{oo}(k) \tag{43}$$

where $$k = 0, 1, \ldots, \frac{N}{8} - 1.$$

Since the terms $A_q^o(k)$ and $$A_q^o\left(k + \frac{N}{8}\right)$$

of (36) through (39) have twiddle factors associated with them, (42) and (43) can be modified accordingly as $$W_N^k A_p^o(k) = W_N^k A_0^{eo}(k) + (-1)^p W_N^{3k} A_0^{oo}(k) \quad (44)$$

and $$W_N^{k+\frac{N}{8}} A_p^o\left(k + \frac{N}{8}\right) = \quad (45)$$

$$W_N^{k+\frac{N}{8}} A_1^{oe}(k) + (-1)^p(-j) W_N^{3k+\frac{N}{8}} A_1^{oo}(k)$$

where $$k = 0, 1, \ldots, \frac{N}{8} - 1.$$

Figure 9:
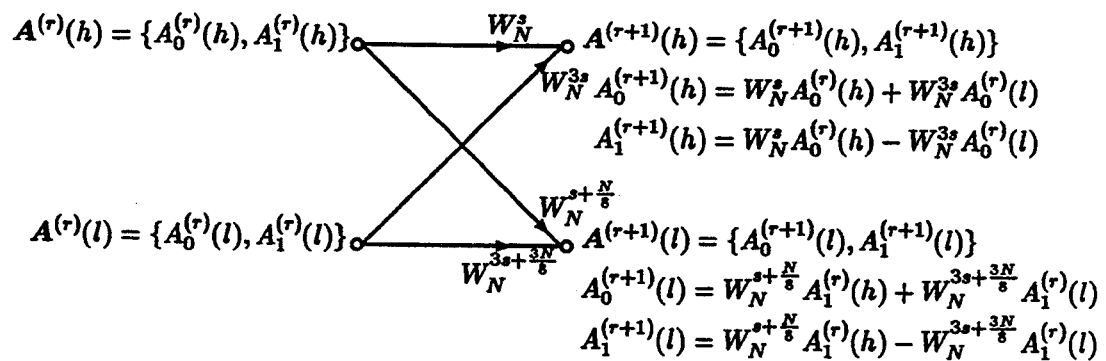
FIG. 9. The butterfly of the $2 \times 2$ PM DIT DFT structure with four twiddle factors.

From (44) and (45), we see that the butterfly of the 2×2 PM structure has up to four non-trivial twiddle factors. The form of these twiddle factors and their interrelationships, in fact, characterizes this structure. The input-output relations of a butterfly of the 2×2 PM DIT structure with four twiddle factors shown in FIG. 9 can be deduced from (44) and (45) as $$A_0^{(r+1)}(h) = A_0^{(r)}(h) W_N^s + A_0^{(r)}(l) W_N^{3s}$$
$$A_1^{(r+1)}(h) = A_0^{(r)}(h) W_N^s - A_0^{(r)}(l) W_N^{3s}$$

$$A_0^{(r+1)}(l) = A_1^{(r)}(h) W_N^{s+\frac{N}{8}} + A_1^{(r)}(l) W_N^{3s+\frac{3N}{8}}$$

$$A_1^{(r+1)}(l) = A_1^{(r)}(h) W_N^{s+\frac{N}{8}} + A_1^{(r)}(l) W_N^{3s+\frac{3N}{8}}$$

where s is an integer whose value depends on the stage of computation r and on the index h.

Figure 10:
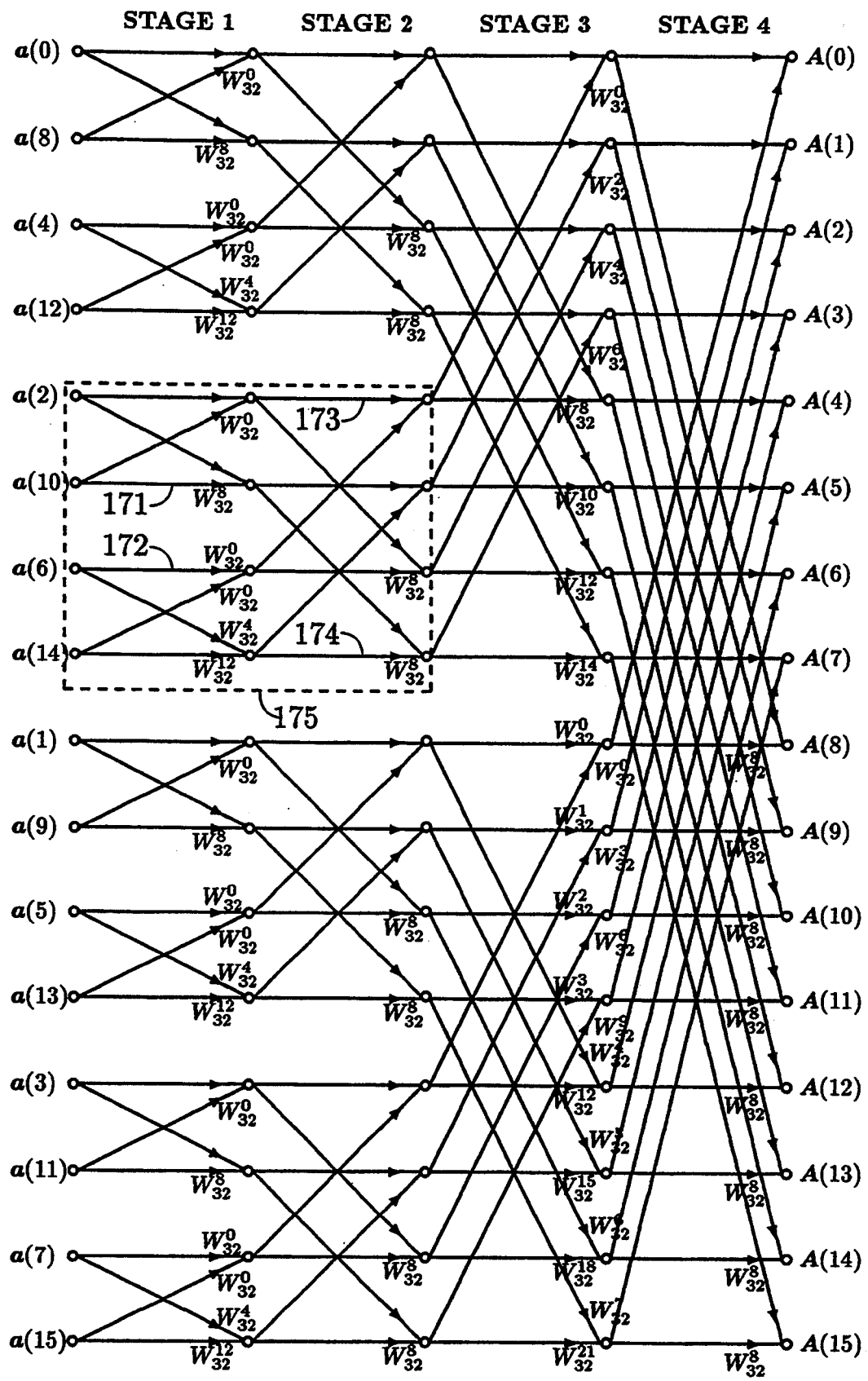
FIG. 10. The flowchart of the $2 \times 2$ PM DIT DFT structure for complex-valued input data with N=32.
Figure 11:
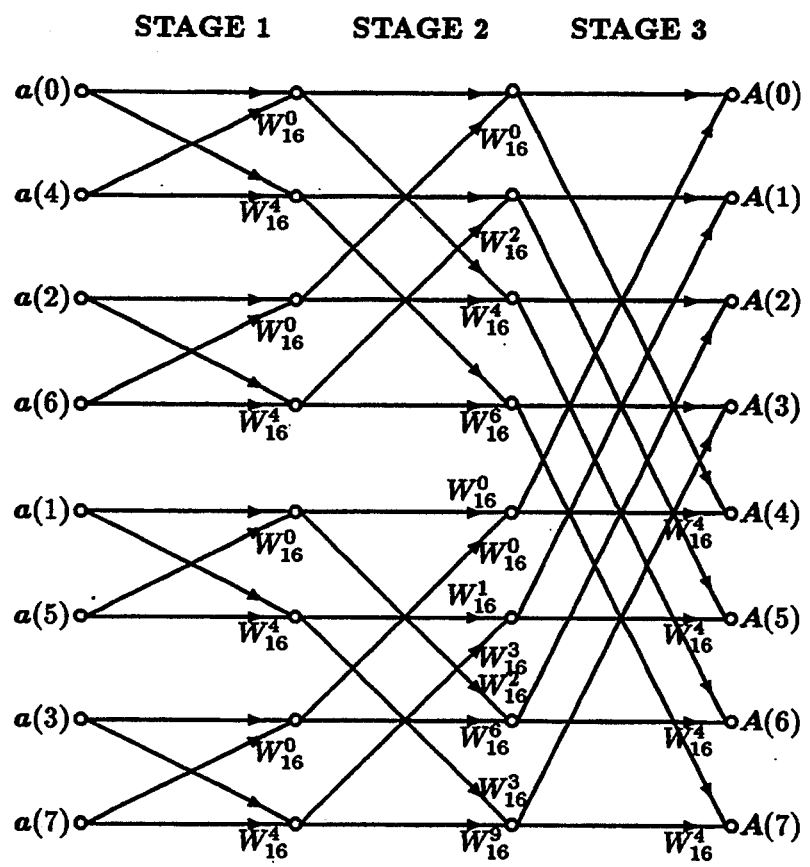
FIG. 11. The flowchart of the $2 \times 2$ PM DIT DFT structure for complex-valued input data with N=16.

FIG. 10 shows the flowchart of the 2×2 PM DIT structure for N=32. There are four stage of computation after the formation of the input vectors. The multiplication operations of the first and the second stages and those of the third and the fourth stages are separately combined. A 2×2 PM DIT butterfly is shown in dashed box 175. Butterflies marked 173 and 174 require no nontrivial multiplications. Butterfly marked 171 requires, in general, two nontrivial multiplications. Butterfly marked 172 require, in general, four nontrivial multiplications. If M is even, there is an odd number of stages after the formation of the input vectors. In this case, for the purpose of merging of multiplication operations, stages are paired starting from the last stage. The processing of the left out first stage is done in the same way as in the 2×1 PM DIT structure. The reason of not pairing this stage with the second stage is that it has only trivial multiplications. As an example, the flowchart for the 2×2 PM DIT structure for N=16, (i.e., M=4) is shown in FIG. 11. The 2×2 PM DIT structure, as implemented by (36) through (39), (40), (41), (44), and (45), saves 25% of complex multiplications when compared with the implementation of the 2×1 PM DIT structure. The multiplications in two adjacent stages in the 2×2 PM structure have been combined such that the second stage of the pair has multiplications only by $-j$ and the first one has number of multiplications than those of the two stages together of the 2×1 PM DIT structure. In general, multiplications operation of two or more consecutive stages of a PM structure can be combined together in order to reduce such operations.

We will now derive the 2×2 PM DIF structure for computing the DFT. Expanding (30) such that the summation is only over N/8 terms and noting that $W_{N/2}^{N/8} = -j$, yields $$A_p(2k) = \quad (46)$$

$$\sum_{n=0}^{\frac{N}{8}-1} (-1)^{pn} \left\{ \left( a_o(n) + (-1)^{p\frac{N}{4}} (-1)^k a_o\left(n + \frac{N}{4}\right) \right) + \right.$$

$$(-1)^{p\frac{N}{8}} (-j)^k \left( a_o\left(n + \frac{N}{8}\right) + \right.$$

$$\left. \left. (-1)^{p\frac{N}{4}} (-1)^k a_o\left(n + \frac{3N}{8}\right) \right) \right\} W_{\frac{N}{2}}^{nk},$$

$$k = 0, 1, \ldots, \frac{N}{4} - 1.$$

Changing k to 2k in (46) gives $$A_p(4k) = \quad (47)$$

$$\sum_{n=0}^{\frac{N}{8}-1} (-1)^{pn} \left\{ \left( a_o(n) + (-1)^{p\frac{N}{4}} (-1)^k a_o\left(n + \frac{N}{4}\right) \right) + \right.$$

$$(-1)^{p\frac{N}{8}} (-1)^k \left( a_o\left(n + \frac{N}{8}\right) + \right.$$

$$\left. \left. (-1)^{p\frac{N}{4}} (-1)^k a_o\left(n + \frac{3N}{8}\right) \right) \right\} W_{\frac{N}{2}}^{nk},$$

$$k = 0, 1, \ldots, \frac{N}{8} - 1.$$

Similarly, replacing k by 2k+1 in (46) yields $$A_p(4k + 2) = \quad (48)$$

$$\sum_{n=0}^{\frac{N}{8}-1} (-1)^{pn} \left\{ \left( a_o(n) + (-1)^{p\frac{N}{4}} (-1)^k a_o\left(n + \frac{N}{4}\right) \right) + \right.$$

$$(-1)^{p\frac{N}{8}} (-1)(-j)^k \left( a_o\left(n + \frac{N}{8}\right) + \right.$$

$$\left. \left. (-1)^{p\frac{N}{4}} (-1)^k a_o\left(n + \frac{3N}{8}\right) \right) \right\} W_N^{2n} W_{\frac{N}{4}}^{nk},$$

$$k = 0, 1, \ldots, \frac{N}{4} - 1.$$

Expanding (31) such that the summation is only over N/8 terms yields $$A_p(2k+1) = \quad (49)$$

$$\sum_{n=0}^{\frac{N}{8}-1} (-1)^{pn} \left\{ \left( a_1(n) + (-1)^{p\frac{N}{4}}(-j)(-1)^k a_1\left(n+\frac{N}{4}\right)\right) + \right.$$

$$(-1)^{p\frac{N}{8}} W_N^{\frac{N}{8}} (-j)^k \left( a_1\left(n+\frac{N}{8}\right) + \right.$$

$$\left. (-1)^{p\frac{N}{4}} (-j)(-1)^k a_1\left(N+\frac{3N}{8}\right) \right) \right\} W_N^n W_{\frac{N}{2}}^{nk},$$

$$k = 0, 1, \ldots, \frac{N}{4} - 1.$$

Changing k to 2k in (49) gives $$A_p(4k+1) = \quad (50)$$

$$\sum_{n=0}^{\frac{N}{8}-1} (-1)^{pn} \left\{ \left( a_1(n) + (-1)^{p\frac{N}{4}}(-j)a_1\left(n+\frac{N}{4}\right)\right) + \right.$$

$$(-1)^{p\frac{N}{8}} W_N^{\frac{N}{8}} (-1)^k \left( a_1\left(n+\frac{N}{8}\right) + \right.$$

$$\left. (-1)^{p\frac{N}{4}} (-j) a_1\left(N+\frac{3N}{8}\right) \right) \right\} W_N^n W_{\frac{N}{4}}^{nk},$$

$$k = 0, 1, \ldots, \frac{N}{8} - 1.$$

Similarly, replacing k by 2k+1 in (49) yields $$A_p(4k+3) = \quad (51)$$

$$\sum_{n=0}^{\frac{N}{8}-1} (-1)^{pn} \left\{ \left( a_1(n) + (-1)^{p\frac{N}{4}}(-j)a_1\left(n+\frac{N}{4}\right)\right) + \right.$$

$$(-1)^{p\frac{N}{8}} W_N^{\frac{N}{8}} (-1)^k \left( a_1\left(n+\frac{N}{8}\right) + \right.$$

$$\left. (-1)^{p\frac{N}{4}} (-j) a_1\left(N+\frac{3N}{8}\right) \right) \right\} W_N^{3n} W_{\frac{N}{3}}^{nk},$$

$$k = 0, 1, \ldots, \frac{N}{8} - 1.$$

Figure 12:
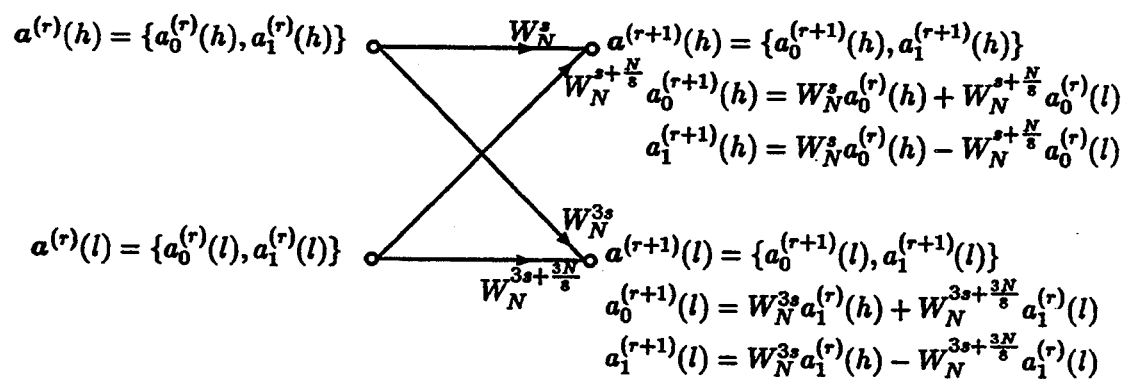
FIG. 12. The butterfly of the $2 \times 2$ PM DIF DFT structure with four twiddle factors.

The input-output relations of a butterfly of the 2×2 PM DIF structures with four twiddle factors shown in FIG. 12, can be deduced from (50) and (51) as $$a_0^{(r+1)}(h) = a_0^{(r)}(h) W_N^s + a_0^{(r)}(l) W_N^{s+\frac{N}{8}}$$

$$a_1^{(r+1)}(h) = a_0^{(r)}(h) W_N^s - a_0^{(r)}(l) W_N^{s+\frac{N}{8}}$$

$$a_0^{(r+1)}(l) = a_1^{(r)}(h) W_N^{3s} + a_1^{(r)}(l) W_N^{3s+\frac{N}{8}}$$

$$a_1^{(r+1)}(l) = a_1^{(r)}(h) W_N^{3s} - a_1^{(r)}(l) W_N^{3s+\frac{N}{8}}$$

where s is an integer whose value depends on the stage of computation r and on the index h.

Figure 13:
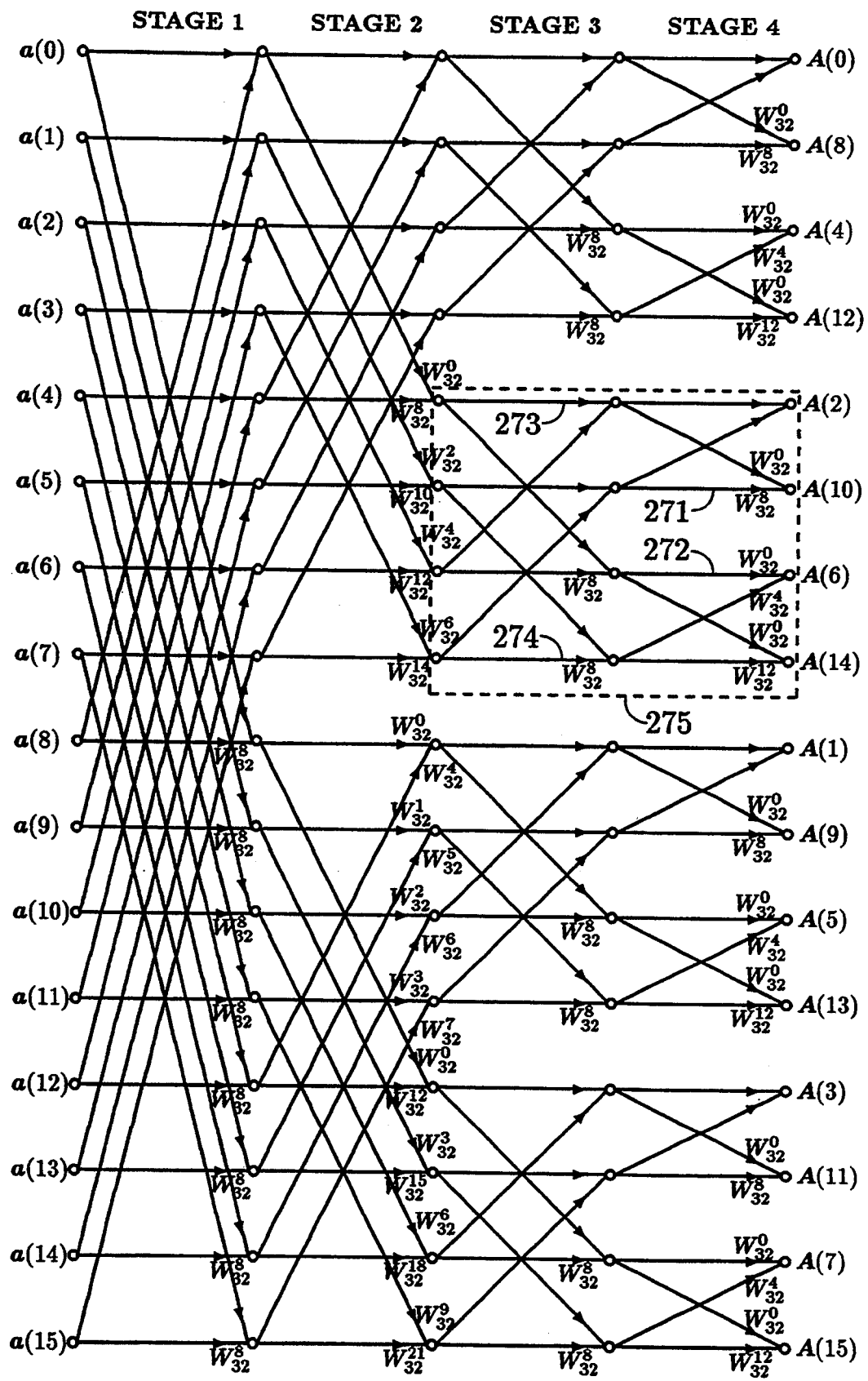
FIG. 13. The flowchart of the $2 \times 2$ PM DIF DFT structure for complex-valued input data with N=32.
Figure 14:
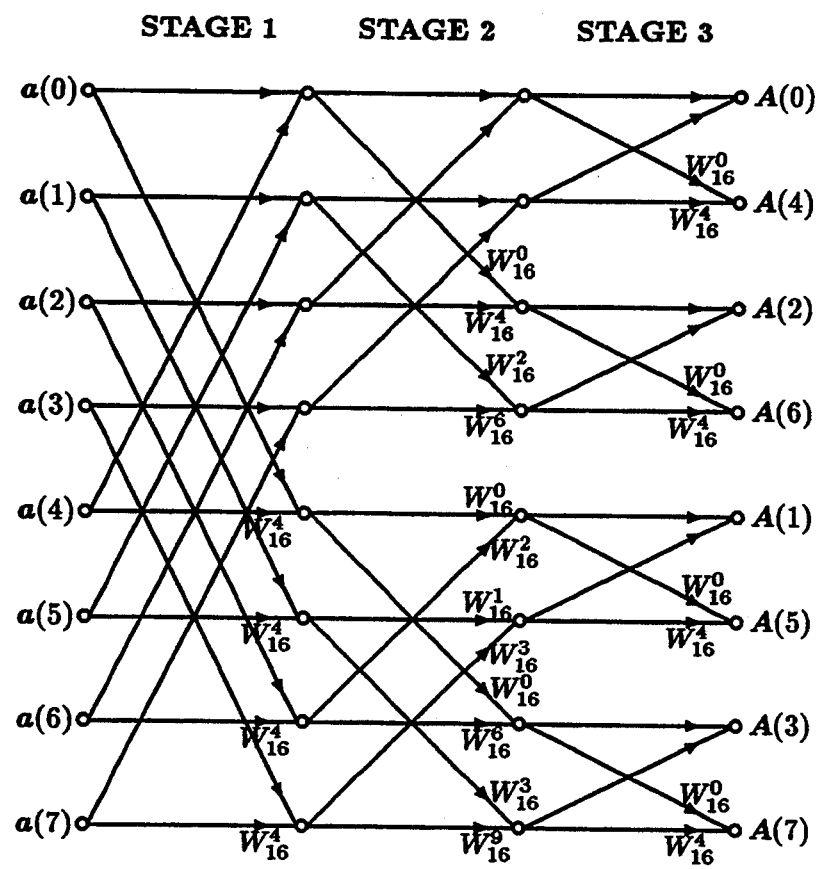
FIG. 14. The flowchart of the $2 \times 2$ PM DIF DFT structure for complex-valued input data with N=16.

FIG. 13 shows the flowchart of the 2×2 PM DIF structure for N=32. A 2×2 PM DIF butterfly is shown in dashed box 275. Butterflies marked 273 and 274 require no nontrivial multiplications. Butterfly marked 271 requires, in general, two nontrivial multiplications. Butterfly marked 272 requires, in general, four nontrivial multiplications. If M is even, there is an odd number of stages after the formation of the input vectors. In this case, in contrast to the 2×2 PM DIT structure, stages are paired starting from the first stage for the purpose of merging of multiplication operations. The processing of the left out last stage is done in a similar way as in the 2×1 PM DIF structure. The reason for not pairing the last stage with the preceding one is that it has only trivial multiplications. As an example, the flowchart for the 2×2 PM DIF structure for N=16, (i.e., M=4) is shown in FIG. 14. The 2×2 PM DIF structure, as implemented by (47), (48), (50), and (51), saves 25% of complex multiplications when compared with the implementation of the 2×1 PM DIF structure. The multiplications in two adjacent stages in the 2×2 PM DIF structure have been combined such that the first stage of the pair has multiplications only by −j and the second one has less number of multiplications than those of the two stages together of the 2×1 PM DIF structure.

Figure 15:
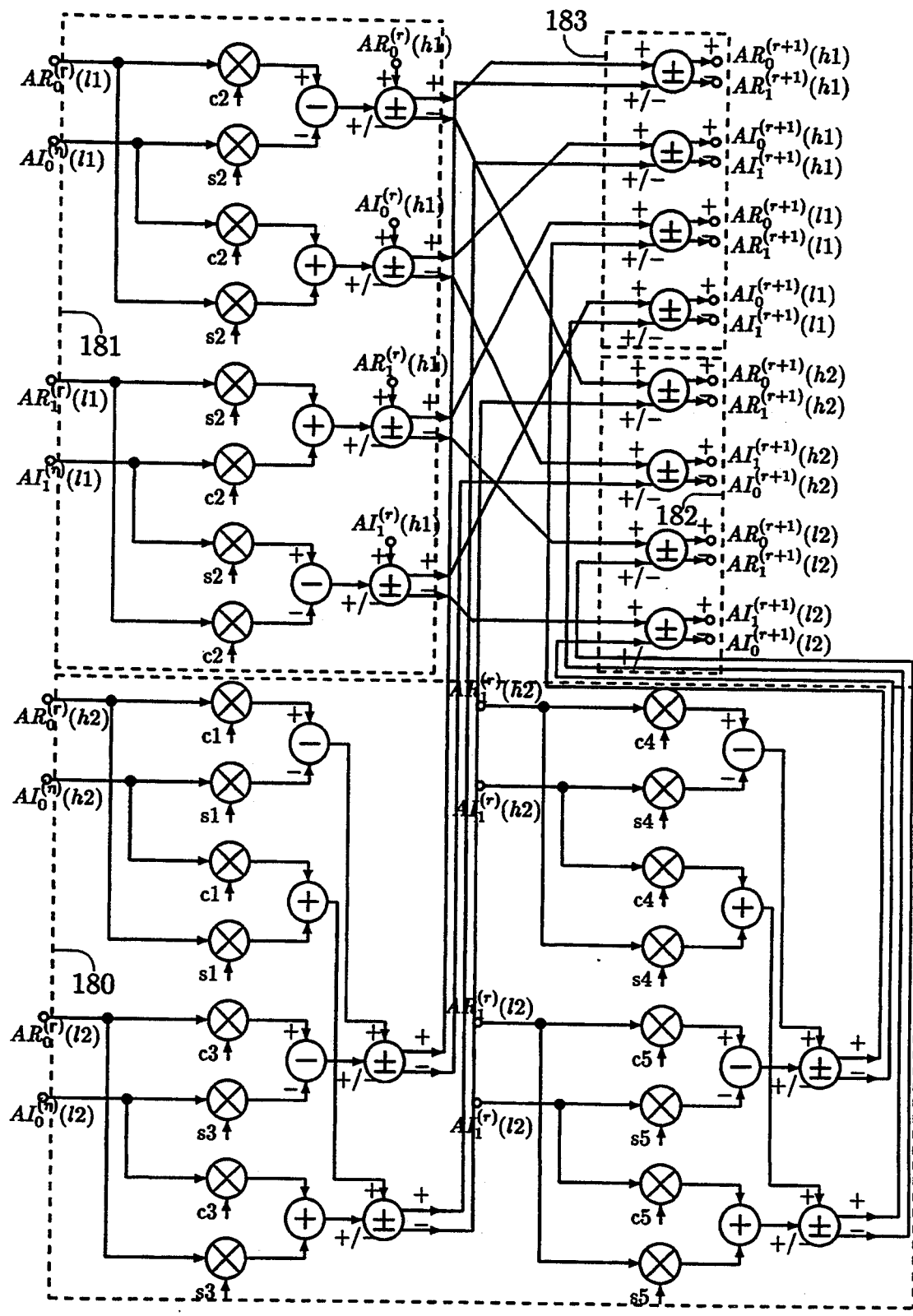
FIG. 15. The hardware realization of the basic computing unit of the $2 \times 2$ PM DIT DFT structure.

FIG. 15 shows a possible hardware realization of the smallest basic computing unit of the 2×2 PM DIT DFT structure marked 175 in FIG. 10 that repeats itself. It consists of 2 pairs of butterflies, with butterflies in each pair coming from two consecutive stages. Butterflies marked 180, 181,182, and 183, respectively, are detailed diagrams of butterflies 172, 171, 173, and 174 of FIG. 10, respectively, As seen from FIG. 5, a single butterfly realization has 8 multipliers, 2 adders, 2 subtractors, and 4 plus-minus units. Therefore, the 2×2 basic computing unit realization of FIG. 15 has a savings of 25% each for multipliers, adders, and subtractors. The basic computing unit produces 8 complex outputs in a cycle when operated as a pipeline. As the 2×2 PM structures have nontrivial multiplications in one of the two consecutive stages, the pipeline of the basic computing unit has only four stages compared with the 6 stages of an equivalent implementation for. the 2×1 PM butterfly. The hardware realization for the 2×2 PM DIF structures will contain same number of multipliers, adders, etc., but the interconnections will be different.

Figure 16:
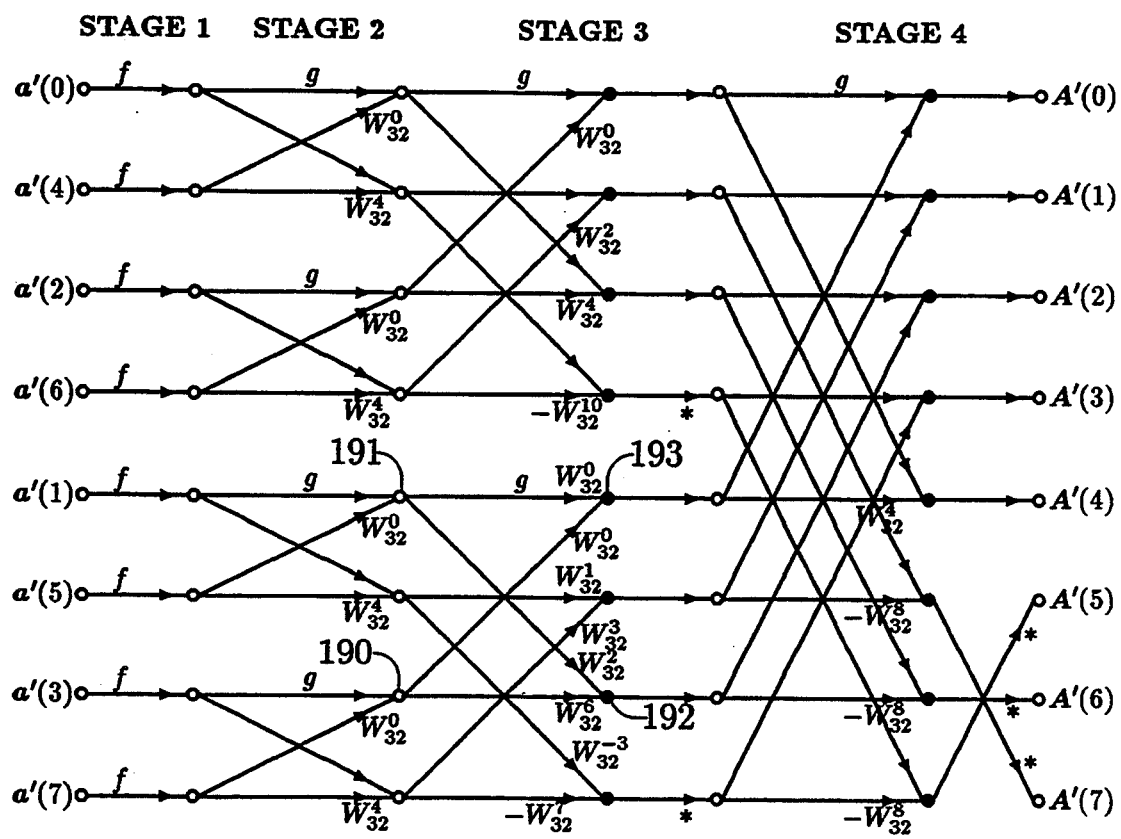
FIG. 16. The flowchart of the $2 \times 2$ PM DIT DFT structure for real-valued input data with N=32.

The 2×2 PM DIT DFT structure for real-valued data is similar to the 2×1 PM DIT DFT structure with the advantage of further saving of 25% of complex multiplications by merging the multiplication operations of consecutive stages. FIG. 16 shows the 2×2 PM DIT DFT structure for real-valued data. A butterfly marked g with ports 190, 191,192, and 193 is slightly different from that of FIG. 7 due to the merging of multiplication operations.

Figure 17:
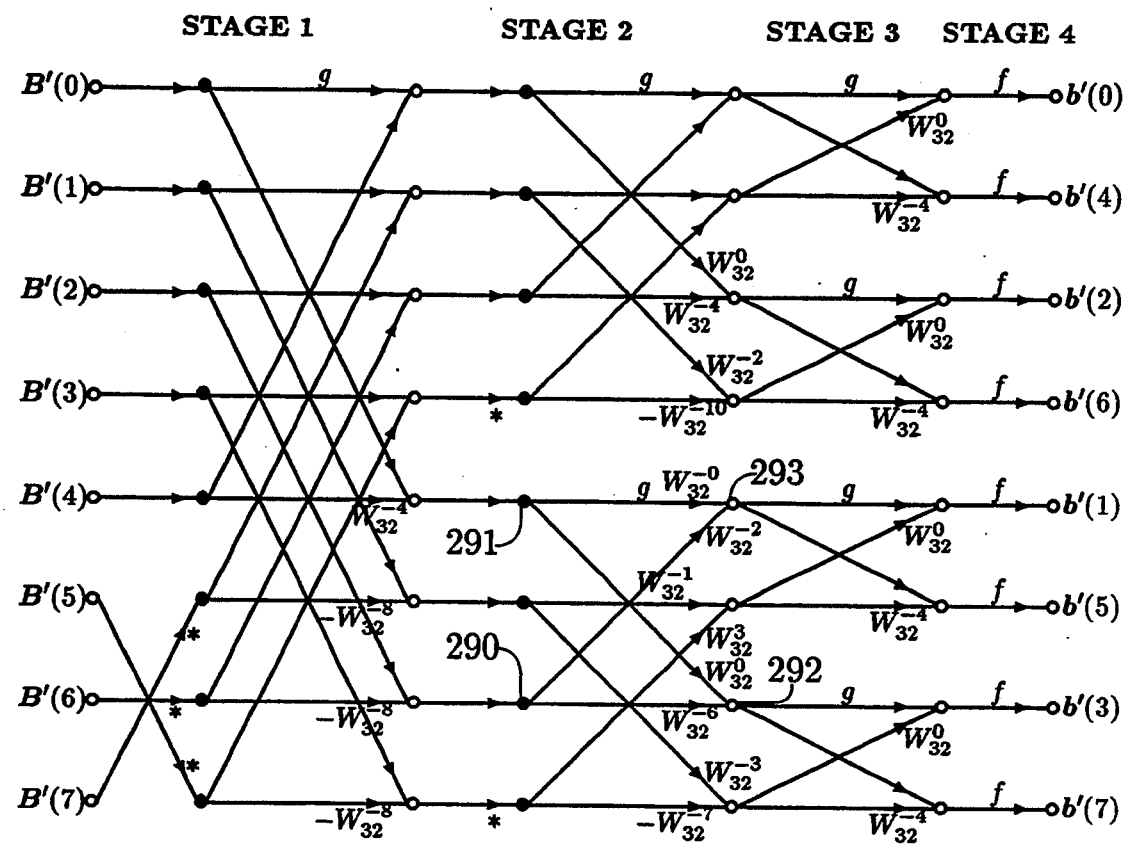
FIG. 17. The flowchart of the $2 \times 2$ PM DIF IDFT structure for the transform of real-valued data with N=32.

The 2×2 PM DIF IDFT structure for the transform of real-valued data is similar to the 2×1 PM DIF IDFT structure with the advantage of further saving of 25% of complex multiplications by merging the multiplication operations of consecutive stages. FIG. 17 shows the 2×2 PM DIF IDFT structure for the transform of real-valued data. A butterfly marked g with ports 290, 291, 292, and 293 is slightly different from that of FIG. 8 due to the merging of multiplication operations.

Figure 18:
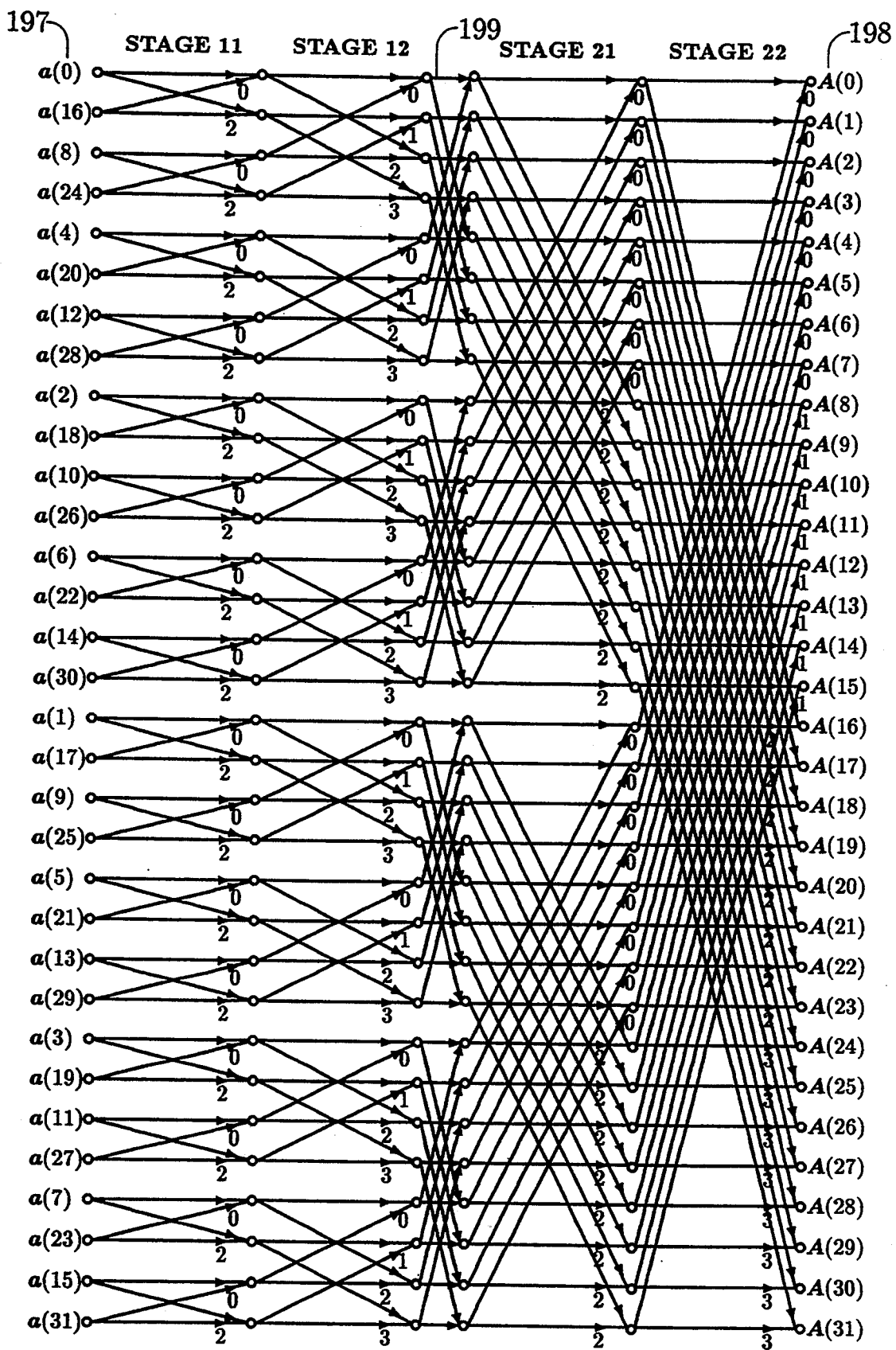
FIG. 18. The flowchart of the $2 \times 1$ PM DIT DFT structure for $8 \times 8$ complex-valued 2-D input data. A twiddle factor $W_8^s$ is shown only by its exponent s.
Figure 19:
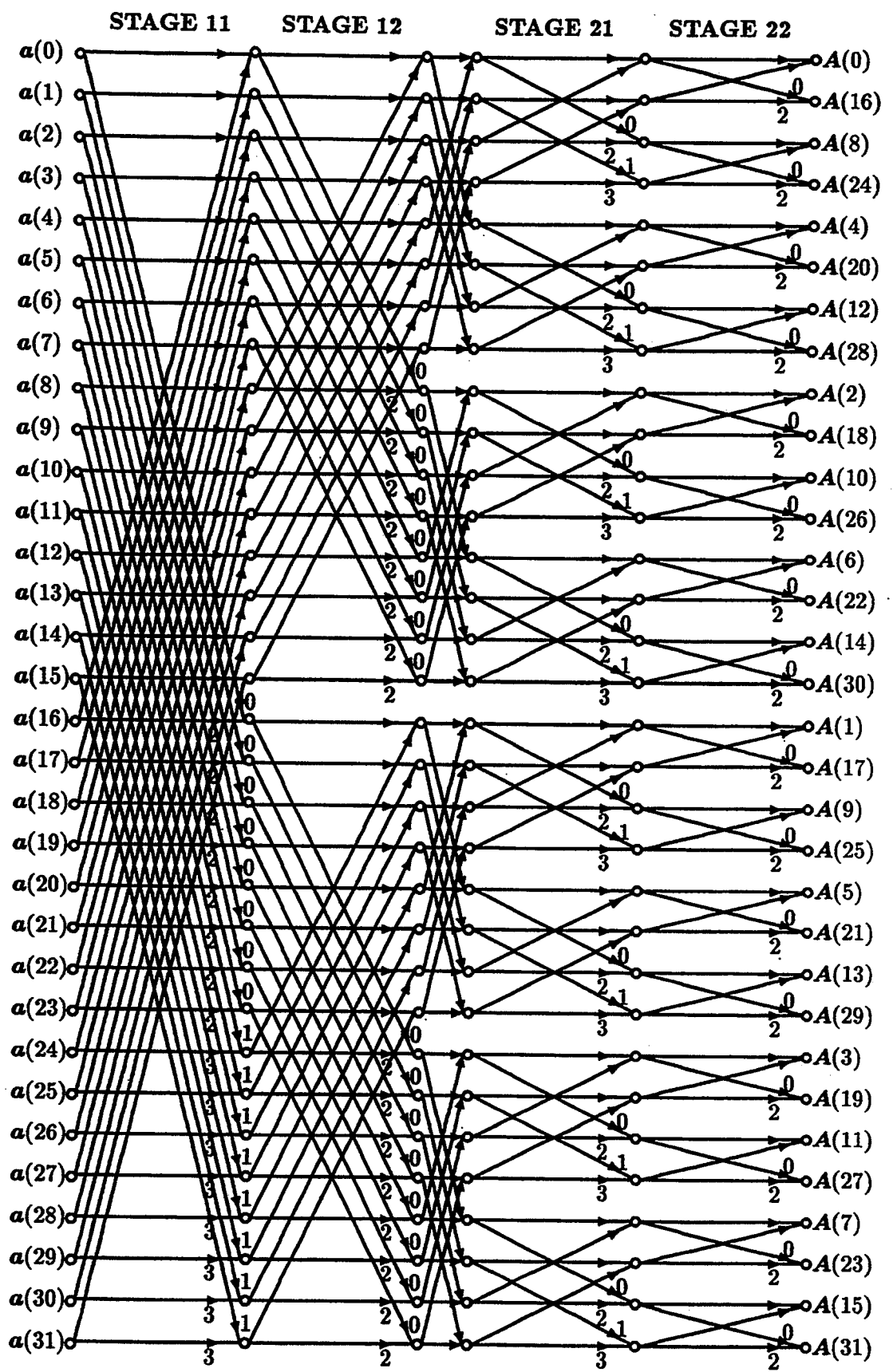
FIG. 19. The flowchart of the $2 \times 1$ PM DIF DFT structure for $8 \times 8$ complex-valued 2-D input data. A twiddle factor $W_8^s$ is shown only by its exponent s.
Figure 20:
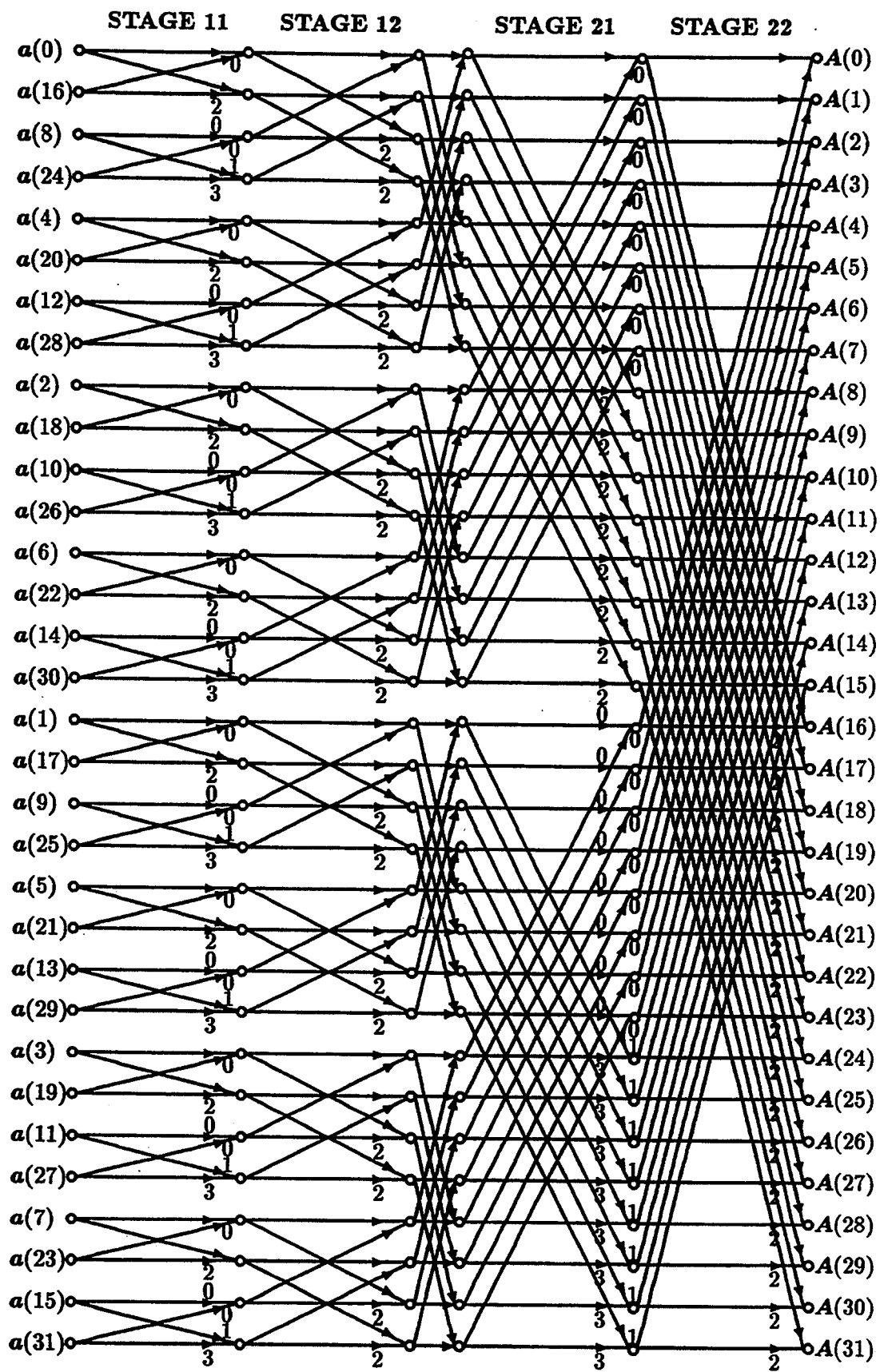
FIG. 20. The flowchart of the $2 \times 2$ PM DIT DFT structure for $8 \times 8$ complex-valued 2-D input data. A twiddle factor $W_8^s$ is shown only by its exponent s.
Figure 21:
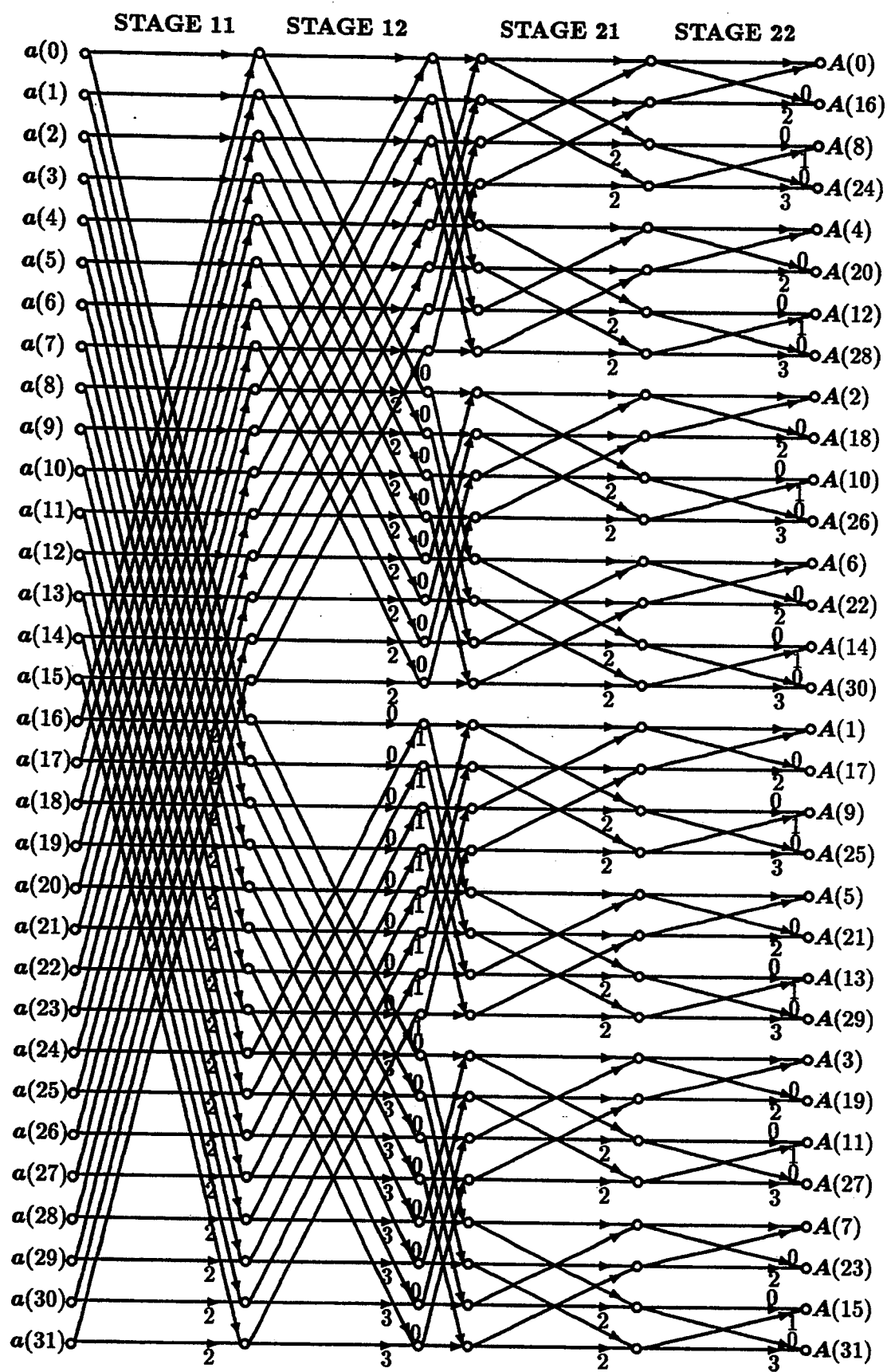
FIG. 21. The flowchart of the $2 \times 2$ PM DIF DFT structure for $8 \times 8$ complex-valued 2-D input data. A twiddle factor $W_8^s$ is shown only by its exponent s.

The DFT and the IDFT of 2-D discrete signals is usually obtained by computing 1-D transforms of each row of data followed by 1-D transforms of each column of the resulting data or vice versa. With this approach, direct application of 1-D DFT or IDFT computational structures yields the required transform. FIGS. 18, 19, 20, and 21 show, respectively the flowchart of the 2×1 DIT, 2×1 DIF, 2×2 DIT, and 2×2 DIF computational structures for computing 2-D DFT of 8×8 complex-valued data. In these figures, the twiddle factors are of the form $W_8^s$ and are represented by their exponents. In FIGS. 18, 19, 20, and 21, the 2-D input data is read row by row. The column transform is carried out in the first two stages. The third stage makes the vectors for the row transform carried out in the last two stages. In FIG. 18, reference numerals 197 and 198 show, respectively, an input and output vector with index zero. Reference numeral 199 shows a butterfly for the computation of vectors for the row transforms. It is possible to do the row transform first and column transform next by inputting the data column by column. Also it is possible to use DIF structure for one transform and DIT structure for the next.

In this disclosure, the invention of a large set of computational structures, referred to as the PM computational structures, along with their hardware implementations for transformation of real-valued or complex-valued one-dimensional or two-dimensional discrete signals from the time-domain to the frequency-domain and vice versa has been reported. These structures have been derived from the design of a large family of radix-2 decimation-in-time and decimation-in-frequency algorithms, referred to as the PM algorithms, to compute the discrete Fourier transform or the inverse discrete Fourier transform. A member of the set of PM structures is characterized by two parameters, u and v where u ($u=2^r$, r=1,2, ... ,($\log_2 N$)−1) specifies the size of each data vector applied at the two input nodes of a butterfly and v represents the number of consecutive stages of the structure whose multiplication operations are merged partially or fully. The formation of the vectors of the input data allows the computation of u 2-point DFTs or IDFTs by a single butterfly. Each computational structure essentially consists of two parts. In the first part, u-element vectors are formed from the N samples of the given discrete signal. In the second part, each butterfly of an interconnected network of butterflies operating on 2 u-element input vectors produce 2 u-element output vectors.

The nature of the problem of computing the discrete Fourier transform is such that a more efficient solution is achieved by the computational structures with u=2. In this disclosure, a detailed description of the 2×1 and 2×2 PM computational structures for real and complex-valued one and two-dimensional discrete signals have been presented. The PM structures described in this disclosure provide the advantages of less complex multiplications, less bit-reversals, less array-index updating, and no independent data swapping compared with the Cooley-Tukey radix-2 structure.

From the general principles of the present invention and the description of the two preferred embodiments, the 2×1 and 2×2 PM structures, presented in this disclosure, those skilled in the art will readily comprehend the various modifications to which the present invention is susceptible. Examples of some of the modifications are listed below: (i) Structures with butterflies that handle vectors of more than one size can be derived. (ii) Structures with varying vector lengths from stage to stage can be realized. (iii) Structures for any positive integer value of the data length N and for vector length u less than N can be designed. (iv) Structures for m-dimensional signals (m>2) can be designed. (v) Higher-radix structures can be designed. (vi) Structures in which multiplication operations of more than two consecutive stages merged can be derived. For example, when the multiplication operations of three consecutive stages are merged in the 2×3 PM structure an additional savings of 8⅓% in real multiplication operations over that provided by the 2×2 PM structures is obtained.

TABLE I

The number of real multiplications, additions and twiddle factors required by the 2 × 1 PM structures for complex-valued input data with 3-butterfly implementation

| N | Multiplications | Additions | Twiddle factors |
|---|---|---|---|
| 16 | 28 | 148 | 2 |
| 32 | 108 | 388 | 8 |
| 64 | 332 | 964 | 22 |
| 128 | 908 | 2308 | 52 |
| 256 | 2316 | 5380 | 114 |
| 512 | 5644 | 12292 | 240 |
| 1024 | 13324 | 27652 | 494 |
| 2048 | 30732 | 61444 | 1004 |
| 4096 | 69644 | 135172 | 2026 |
| 8192 | 155660 | 294916 | 4072 |
| 16384 | 344076 | 638980 | 8166 |
| 32768 | 753676 | 1376260 | 16356 |
| 65536 | 1638412 | 2949124 | 32738 |

TABLE II

The number of real multiplications, additions and twiddle factors required by the 2 × 2 PM structures for complex-valued input data with 3-butterfly implementation

| N | Multiplications | Additions | Twiddle factors generated By function call | By using algebraic expressions |
|---|---|---|---|---|
| 16 | 24 | 144 | 0 | 0 |
| 32 | 88 | 376 | 2 | 8 |
| 64 | 264 | 920 | 6 | 24 |
| 128 | 712 | 2200 | 16 | 64 |
| 256 | 1800 | 5080 | 36 | 144 |
| 512 | 4360 | 11608 | 78 | 312 |
| 1024 | 10248 | 25944 | 162 | 648 |
| 2048 | 23560 | 57688 | 332 | 1328 |
| 4096 | 53256 | 126296 | 672 | 2688 |
| 8192 | 118792 | 275800 | 1354 | 5416 |
| 16384 | 262152 | 595288 | 2718 | 10872 |
| 32768 | 573448 | 1283416 | 5448 | 21792 |
| 65536 | 1245192 | 2741592 | 10908 | 43632 |

Having described our invention, we claim:

1. A radix-2 decimation-in-time fast-Fourier-transform butterfly arithmetic unit operating on four complex input signals designated first, second, third, and fourth complex input signals, comprising:

(a) a first complex multiplier circuit, fed by said third complex input signal and a complex twiddle factor signal, for providing a first multiplier output signal indicative of the product of said third complex input signal and said complex twiddle factor signal;

(b) a second complex multiplier circuit, fed by said fourth complex input signal and said complex twiddle factor signal, for providing a second multiplier output signal indicative of the product of said fourth complex input signal and a 90 degrees phase-shifted version of said complex twiddle factor signal;

(c) a first pair of plus-minus units, fed by said first complex input signal and said first multiplier output signal, for providing a first and a second complex butterfly output signal indicative of the sum and difference of said first complex input signal and said first multiplier output signal; and (d) a second pair of plus-minus units, fed by said second complex input signal and said second multiplier output signal, for providing a third and a fourth complex butterfly output signal indicative of the sum and difference of said second complex input signal and said second multiplier output signal.

2. A radix-2 decimation-in-frequency fast-Fourier-transform butterfly arithmetic unit operating on four complex input signals designated first, second, third, and fourth complex input signals, comprising:

(a) a first complex multiplier circuit, fed by said second complex input signal and a complex twiddle factor signal, for providing a first multiplier output signal indicative of the product of said second complex input signal and said complex twiddle factor signal;

(b) a second complex multiplier circuit, fed by said fourth complex input signal and said complex twiddle factor signal, for providing a second multiplier output signal indicative of the product of said fourth complex input signal and a 90 degrees phase-shifted version of said complex twiddle factor signal;

(c) a first pair of plus-minus units, fed by said first and said third complex input signal, for providing a first and a second complex butterfly output signal indicative of the sum and difference of said first and said third complex input signal; and (d) a second pair of plus-minus units, fed by said first and said second multiplier output signal, for providing a third and a fourth complex butterfly output signal indicative of the sum and difference of said first and said second multiplier output signal.

3. A radix-2 fast-Fourier-transform butterfly arithmetic unit operating on four complex input signals designated first, second, third, and fourth complex input signals, comprising:

(a) a first complex multiplier circuit, fed by said first complex input signal and a first complex twiddle factor signal, for providing a first multiplier output signal indicative of the product of said first complex input signal and said first complex twiddle factor signal;

(b) a second complex multiplier circuit, fed by said second complex input signal and a second complex twiddle factor signal, for providing a second multiplier output signal indicative of the product of said second complex input signal and said second complex twiddle factor signal;

(c) a third complex multiplier circuit, fed by said third complex input signal and a third complex twiddle factor signal, for providing a third multiplier output signal indicative of the product of said third complex input signal and said third complex twiddle factor signal;

(d) a fourth complex multiplier circuit, fed by said fourth complex input signal and a fourth complex twiddle factor signal, for providing a fourth multiplier output signal indicative of the product of said fourth complex input signal and said fourth complex twiddle factor signal;

(e) a first pair of plus-minus units, fed by said first and said third multiplier output signal, for providing a first and a second complex butterfly output signal indicative of the sum and difference of said first and said third multiplier output signal; and (f) a second pair of plus-minus units, fed by said second and said fourth multiplier output signal, for providing a third and a fourth complex butterfly output signal indicative of the sum and difference of said second and said fourth multiplier output signal.

4. A radix-2 decimation-in-time fast-Fourier-transform butterfly arithmetic unit comprising the device of claim 3 in which the magnitude of the phase difference between said first and said second complex twiddle factor signal is 45 degrees.

5. A radix-2 decimation-in-frequency fast-Fourier-transform butterfly arithmetic unit comprising the device of claim 3 in which the magnitude of the phase difference between said first and said third complex twiddle factor signal is 45 degrees.

* * * * *

UNITED STATES PATENT AND TRADEMARK OFFICE
CERTIFICATE OF CORRECTION

PATENT NO. : 5,371,696

DATED : December 6, 1994

INVENTOR(S) : Duraisamy Sundararajan, M. Omair Ahmad, and M.N. Srikanta Swamy

It is certified that error appears in the above-indentified patent and that said Letters Patent is hereby corrected as shown below:

In the title page, col. 1, line 1, delete "THE"

Col. 1, line 2, delete "THE"

Col. 1, line 21, change "decimation-infre" to "–decimation-in-fre–"

Col. 2, line 11, change "$W_{N^{N/4}}$" to "–$W_N^{\frac{N}{4}}$–"

Col. 2, line 16, change "$W_{N^{N/4}}$" to "–$W_N^{\frac{N}{4}}$–"

Col. 2, line 51, change "$W_{8^s}$" to "–$W_8^s$–"

Col. 2, line 54, change "$W_{8^s}$" to "–$W_8^s$–"

Col. 2, line 57, change "$W_{8^s}$" to "–$W_8^s$–"

Col. 2, line 60, change "$W_{8^s}$" to "–$W_8^s$–"

Col. 3, line 9, change "log2 u" to –$\log_2 u$–

Col. 3, line 45, delete "(2)"

Col. 3, line 46, change "$W_{u^1}$" to "–$W_u^1$–"

Col. 3, line 48, before "can be" insert "–(2) –"

Col. 4, line 3, change "$a(n)$" to "–$a(n)$–"

Col. 4, line 7, change "$a(n)$" to "–$a(n)$–"

Col. 4, line 11, change "$a(n)$" to "–$a(n)$–"

UNITED STATES PATENT AND TRADEMARK OFFICE
CERTIFICATE OF CORRECTION

PATENT NO. : 5,371,696
DATED : December 6, 1994
INVENTOR(S) : Duraisamy Sundararajan, M. Omair Ahmad, and M.N. Srikanta Swamy It is certified that error appears in the above-indentified patent and that said Letters Patent is hereby corrected as shown below:

Col. 4, line 28, change "$W_{N^k}$" to "-$W_N^k$-"

Col. 4, line 62, after "$k$ mod $u$." insert equation number "-(6)-"

Col. 5, line 7, change "$q_q$" to "-$a_q$-"

Col. 5, line 19, change "$A(k)$" to "-$A(k)$-"

Col. 5, line 33, change "$W_{u^1}$" to "-$W_u^1$-"

Col. 5, line 36, change "$W_{u^1})^{10}$" to "-$W_u^1)^{1p}$-"

Col. 5, line 36, change "$W_{u^1}$" to "-$W_u^1$-"

Col. 5, line 46, change "$W_{u^1}$" to "-$W_u^1$-"

Col. 5, line 52, after "$(k + p\frac{N}{u})$" insert "- mod $u$-"

Col. 5, line 55, delete "mod u and u"

Col. 5, line 67, change "$B(k)$" to "-$B(k)$-"

Col. 6, line 15, change "$b(n)$" to "-$b(n)$-"

Col. 6, line 33, after "$(n + p\frac{N}{u})$" insert "- mod $u$-"

Col. 6, line 36, delete "mod u"

Col. 6, line 40, after "respectively," insert "- as-"

Col. 6, line 42, change "$a(n)$" to "-$a(n)$-"

Col. 6, line 42, after "$a_0(n)$" insert "-,-"

UNITED STATES PATENT AND TRADEMARK OFFICE
CERTIFICATE OF CORRECTION

PATENT NO. : 5,371,696
DATED : December 6, 1994
INVENTOR(S) : Duraisamy Sundararajan, M. Omair Ahmad, and M.N. Srikanta Swamy It is certified that error appears in the above-indentified patent and that said Letters Patent is hereby corrected as shown below:

Col. 6, line 45, change "$z(n)$" to "--$x(n)$--"

Col. 6, line 52, change "$A(k)$" to "--$A(k)$--"

Col. 6, line 58, change "$W_n^{nk}$" to "--$W_N^{nk}$--"

Col. 6, line 61, change "$A(k)$" to "--$A(k)$--"

Col. 6, line 68, change "$B(k)$" to "--$B(k)$--"

Col. 7, line 17, change "$b(n)$" to "--$b(n)$--"

Col. 7, line 27, change "$b(n)$" to "--$b(n)$--"

Col. 7, line 58, change "$W_n^{(2n+1)k}$" to "--$W_N^{(2n+1)k}$--"

Col. 7, line 60, change "$W_{N^{2nk}}$" to "--$W_N^{2nk}$--"

Col. 7, line 60, change "$W_{N/2^{nk}}$" to "--$W_{\frac{N}{2}}^{nk}$--"

Col. 7, line 65, change "$W_{n^k}$" to "--$W_N^k$--"

Col. 8, line 14, change "$W_{N^{N/4}}$" to "--$W_N^{\frac{N}{4}}$--"

Col. 8, line 14, change "$W_{N/2^{N/4}}$" to "--$W_{\frac{N}{2}}^{\frac{N}{4}}$--"

Col. 8, line 14, after "as" delete'--.--"

Col. 8, line 18, change "$W_{\frac{n}{2}}$" to "--$W_{\frac{N}{2}}$--"

UNITED STATES PATENT AND TRADEMARK OFFICE
CERTIFICATE OF CORRECTION

PATENT NO. : 5,371,696

DATED : December 6, 1994

INVENTOR(S) : Duraisamy Sundararajan, M. Omair Ahmad, and M.N. Srikanta Swamy

It is certified that error appears in the above-indentified patent and that said Letters Patent is hereby corrected as shown below:

Col. 8, line 21, change "$W_{N^k}$" to "--$W_N^k$--"

Col. 8, line 28, change "$A_0e$" to "--$A_0^e$--"

Col. 8, line 28, change "$A_1e$" to "--$A_1^e$--"

Col. 8, line 33, change "$A_0e$" to "--$A_0^e$--"

Col. 8, line 39, change "$A_1e$" to "--$A_1^e$--"

Col. 8, line 43, change "$A_0o$" to "--$A_0^o$--"

Col. 8, line 43, change "$A_1o$" to "--$A_1^o$--"

Col. 8, line 48, change "$A_0o$" to "--$A_0^o$--"

Col. 8, line 54, change "$A_1o$" to "--$A_1^o$--"

Col. 8, line 66, change "$A_P$" to "--$A_p$--"

Col. 8, line 66, change "$A_0e$" to "--$A_0^e$--"

Col. 8, line 66, change "$W_{N^k}$" to "--$W_N^k$--"

Col. 8, line 66, change "$A_0o$" to "--$A_0^o$--"

Col. 9, line 3, change "$A_1e$" to "--$A_1^e$--"

Col. 9, line 3, change "$W_{N^k}$" to "--$W_N^k$--"

Col. 9, line 3, change "$A_1o$" to "--$A_1^o$--"

Col. 9, line 18, change "$A_0e$" to "--$A_0^e$--"

UNITED STATES PATENT AND TRADEMARK OFFICE
CERTIFICATE OF CORRECTION

PATENT NO. : 5,371,696

DATED : December 6, 1994

INVENTOR(S) : Duraisamy Sundararajan, M. Omair Ahmad, and M.N. Srikanta Swamy

It is certified that error appears in the above-indentified patent and that said Letters Patent is hereby corrected as shown below:

Col. 9, line 18, change "$A_1e$" to "$-A_1^e-$"

Col. 9, line 18, change "$A_0o$" to "$-A_0^o-$"

Col. 9, line 19, change "$A_1o$" to "$-A_1^o-$"

Col. 9, line 26, change "$W_N s$" to "$-W_N^s-$"

Col. 9, line 27, change "$)+A$" to "$-)-A-$"

Col. 9, line 27, change "$W_N s$" to "$-W_N^s-$"

Col. 9, line 29, change "$A_0^{(r)}(h)$" to "$-A_1^{(r)}(h)-$"

Col. 9, line 29, change "$A_0^{(r)}(l)$" to "$-A_1^{(r)}(l)-$"

Col. 9, line 32, change "$A_0^{(r)}(h)$" to "$-A_1^{(r)}(h)-$"

Col. 9, line 32, change "$)+A$" to "$-)-A-$"

Col. 9, line 32, change "$A_0^{(r)}(l)$" to "$-A_1^{(r)}(l)-$"

Col. 10, line 23, change "$W_n^{nk}$" to "$-W_N^{nk}-$"

Col. 10, line 35, change "$W_n^{nk}$" to "$-W_N^{nk}-$"

Col. 10, line 39, change "$W_n^{(n+\frac{N}{4})}$" to "$-W_N^{(n+\frac{N}{4})}-$"

Col. 10, line 58, change "$(-j)$" to "$-(-1)-$"

Col. 10, line 65, change "$a_l(n)$" to "$-a_1(n)-$"

UNITED STATES PATENT AND TRADEMARK OFFICE
CERTIFICATE OF CORRECTION

PATENT NO. : 5,371,696

DATED : December 6, 1994

INVENTOR(S) : Duraisamy Sundararajan, M. Omair Ahmad, and M.N. Srikanta Swamy

It is certified that error appears in the above-indentified patent and that said Letters Patent is hereby corrected as shown below:

Col. 10, line 65, change "$(-j)^k$" to "$-(-j)(-1)^k$-"

Col. 10, line 65, change "$a_l(n+\frac{N}{4})$" to "$-a_1(n+\frac{N}{4})$-"

Col. 10, line 65, change "$W_N n$" to "$-W_N^n$-"

Col. 11, line 21, change "$+a_0^{(r)}(l)$" to "$--a_0^{(r)}(l)$-"

Col. 11, line 23, change "$W_N s$" to "$-W_N^s$-"

Col. 11, line 26, change "$W_N s$" to "$-W_N^s$-"

Col. 11, line 26, change "$+a_1^{(r)}(l)$ to "$--a_1^{(r)}(l)$-"

Col. 12, line 4, change "subtrax:tots" to "- subtractors -"

Col. 12, line 13, change "$\pm$" to "- +/- -"

Col. 12, line 15, change "$\pm$" to "- +/- -"

Col. 12, line 21, change "$W_N s$" to "$-W_N^s$-"

Col. 12, line 30, change "$W_N s$" to "$-W_N^s$-"

Col. 12, line 64, change "date" to "-data-"

Col. 13, line 13, change "X.(N/2)" to "-X(N/2)-"

Col. 13, line 35, change "$a'(n)$" to "$-\boldsymbol{a}'(n)$-"

Col. 13, line 35, change "$a(n)$" to "$-\boldsymbol{a}(n)$-"

UNITED STATES PATENT AND TRADEMARK OFFICE
CERTIFICATE OF CORRECTION

PATENT NO. : 5,371,696

DATED : December 6, 1994

INVENTOR(S) : Duraisamy Sundararajan, M. Omair Ahmad, and M.N. Srikanta Swamy

It is certified that error appears in the above-indentified patent and that said Letters Patent is hereby corrected as shown below:

Col. 13, line 35, change "$a(n + \frac{N}{4})$" to "–$\boldsymbol{a}(n + \frac{N}{4})$–"

Col. 13, line 51, change "$A'(0)$" to "–$\boldsymbol{A'}(0)$–"

Col. 13, line 54, change "$A(0)$" to "–$\boldsymbol{A}(0)$–"

Col. 13, line 57, change "$A'(k)$" to "–$\boldsymbol{A'}(k)$–"

Col. 13, line 57, change "$A(k)$" to "–$\boldsymbol{A}(k)$–"

Col. 14, line 50, change "$B'(0)$" to "–$\boldsymbol{B'}(0)$–"

Col. 14, line 50, change "$B(0)$" to "–$\boldsymbol{B}(0)$–"

Col. 14, line 50, change "$B(\frac{N}{4})$" to "–$\boldsymbol{B}(\frac{N}{4})$–"

Col. 14, line 60, change "$B'(k)$" to "–$\boldsymbol{B'}(k)$–"

Col. 14, line 60, change "$B(k)$" to "–$\boldsymbol{B}(k)$–"

Col. 14, line 60, change "$(X(k + \frac{N}{2})$" to "–$(X(k) - X(k + \frac{N}{2})$–"

Col. 14, line 66, change "$b'(n)$" to "–$\boldsymbol{b'}(n)$–"

Col. 14, line 66, change "$b(n)$" to "–$\boldsymbol{b}(n)$–"

Col. 14, line 66, change "$b(n + \frac{N}{4})$" to "–$\boldsymbol{b}(n + \frac{N}{4})$–"

Col. 15, line 7, change "computation" to "–computational–"

Col. 15, line 56, change "$A_0e$" to "–$A_0^e$–"

Col. 15, line 56, change "$W_{N^k}$" to "–$W_N^k$–"

UNITED STATES PATENT AND TRADEMARK OFFICE
CERTIFICATE OF CORRECTION

PATENT NO. : 5,371,696
DATED : December 6, 1994
INVENTOR(S) : Duraisamy Sundararajan, M. Omair Ahmad, and M.N. Srikanta Swamy It is certified that error appears in the above-indentified patent and that said Letters Patent is hereby corrected as shown below:

Col. 15, line 56, change "$A_0o$" to "$-A_0^o-$"

Col. 15, line 60, change "$A_1e$" to "$-A_1^e-$"

Col. 15, line 60, change "$W_{Nk}$" to "$-W_N^k-$"

Col. 15, line 60, change "$A_1o$" to "$-A_1^o-$"

Col. 16, line 13, before "these" insert "–in –"

Col. 16, line 21, change "$A_0e$" to "$-A_0^e-$"

Col. 16, line 21, change "$(-1)^P$" to "$-(-1)^P-$"

Col. 16, line 21, change "$A_0o$" to "$-A_0^o-$"

Col. 16, line 30, change "$A_1e$" to "$-A_1^e-$"

Col. 16, line 30, change "$A_1o$" to "$-A_1^o-$"

Col. 16, line 39, change "$A_qe$" to "$-A_q^e-$"

Col. 16, line 39, change "$A_qo$" to "$-A_q^o-$"

Col. 16, line 42, change ",;" to "–;–"

Col. 16, line 50, change "$A_pe$" to "$-A_p^e-$"

Col. 16, line 53, change "$A_pe$" to "$-A_p^e-$"

Col. 16, line 55, change "$A_po$" to "$-A_p^o-$"

Col. 16, line 55, change "$A_0^{oo}$" to "$-A_0^{oo}-$"

UNITED STATES PATENT AND TRADEMARK OFFICE
CERTIFICATE OF CORRECTION

PATENT NO. : 5,371,696
DATED : December 6, 1994
INVENTOR(S) : Duraisamy Sundararajan, M. Omair Ahmad, and M.N. Srikanta Swamy It is certified that error appears in the above-indentified patent and that said Letters Patent is hereby corrected as shown below:

Col. 16, line 60, change "$A_{p^o}$" to "$-A_p^o-$"

Col. 16, line 68, change "$A_{q^o}$" to "$-A_q^o-$"

Col. 17, line 3, change "$A_{q^o}$" to "$-A_q^o-$"

Col. 17, line 10, change "$W_{N^k}$" to "$-W_N^k-$"

Col. 17, line 10, change "$A_{p^o}$" to "$-A_p^o-$"

Col. 17, line 10, change "$W_{N^k}$" to "$-W_N^k-$"

Col. 17, line 10, change "$A_0^{eo}$" to "$-A_0^{oe}-$"

Col. 17, line 15, change "$A_{p^o}$" to "$-A_p^o-$"

Col. 17, line 33, change "$W_{N^s}$" to "$-W_N^s-$"

Col. 17, line 34, change "$W_{N^s}$" to "$-W_N^s-$"

Col. 17, line 40, change "$+A_1^{(r)}(l)$" to "$--A_1^{(r)}(l)-$"

Col. 17, line 54, change "require" to "- requires -"

Col. 18, line 1, before "structure" insert "-DIT -"

Col. 18, line 3, before "number" insert "-less -"

Col. 18, line 12, change "$W_{N/2^{N/8}}$" to "$-W_{\frac{N}{2}}^{\frac{N}{8}}-$"

Col. 18, line 36, delete "$(-1)^k$"

UNITED STATES PATENT AND TRADEMARK OFFICE
CERTIFICATE OF CORRECTION

PATENT NO. : 5,371,696

DATED : December 6, 1994

INVENTOR(S) : Duraisamy Sundararajan, M. Omair Ahmad, and M.N. Srikanta Swamy

It is certified that error appears in the above-indentified patent and that said Letters Patent is hereby corrected as shown below:

Col. 18, line 43, delete "$(-1)^k$"

Col. 18, line 43, change "$W_{\frac{N}{2}}^{nk}$" to "$-W_{\frac{N}{4}}^{nk}-$"

Col. 18, line 54, change "$a_0(n)+($" to "$-a_0(n)-(-$"

Col. 18, line 54, delete "$(-1)^k$"

Col. 18, line 58, change "$(-1)(-j)^k$" to "$-(-j)(-1)^k-$"

Col. 18, line 58, change ")+" to "$-)--$"

Col. 18, line 62, delete "$(-1)^k$"

Col. 18, line 65, change "$\frac{N}{4}$" to "$-\frac{N}{8}-$"

Col. 19, line 12, change "$N+$" to "$-n+-$"

Col. 19, line 12, change "$W_{N^n}$" to "$-W_N^n-$"

Col. 19, line 30, change "$(-1)^P$" to "$-(-1)^P-$"

Col. 19, line 30, change "$N+$" to "$-n+-$"

Col. 19, line 30, change "$W_{N^n}$" to "$-W_N^n-$"

Col. 19, line 40, change "$a_1(n)+($" to "$-a_1(n)-(-$"

Col. 19, line 44, before "$W$" insert "$-(-j)-$"

Col. 19, line 44, change ")+" to "$-)--$"

UNITED STATES PATENT AND TRADEMARK OFFICE
CERTIFICATE OF CORRECTION

PATENT NO. : 5,371,696

DATED : December 6, 1994

INVENTOR(S) : Duraisamy Sundararajan, M. Omair Ahmad, and M.N. Srikanta Swamy

It is certified that error appears in the above-indentified patent and that said Letters Patent is hereby corrected as shown below:

Col. 19, line 48, change "$N+$" to "$-n+-$"

Col. 19, line 48, change "$W^{nk}_{\frac{N}{3}}$" to "$-W^{nk}_{\frac{N}{4}}-$"

Col. 19, line 58, change "$W_{N^s}$" to "$-W^s_N-$"

Col. 19, line 61, change "$W_{N^s}$" to "$-W^s_N-$"

Col. 19, line 64, change "$a_0^{(r)}$" to "$-a_1^{(r)}(-$"

Col. 19, line 64, change "$W_N^{3s+\frac{N}{8}}$" to "$-W_N^{3s+\frac{3N}{8}}-$"

Col. 19, line 67, change "$\frac{N}{8}$" to "$-\frac{3N}{8}-$"

Col. 20, line 49, change "for." to "-for-"

Col. 21, line 13, change "$W_{8^s}$" to "$-W^s_8-$"

Signed and Sealed this

Fifth Day of September, 1995

Attest:

BRUCE LEHMAN

*Attesting Officer*      *Commissioner of Patents and Trademarks*